(12) United States Patent
Xiao

(10) Patent No.: US 10,289,619 B2
(45) Date of Patent: May 14, 2019

(54) DATA PROCESSING WITH STREAMING DATA

(71) Applicant: SAS Institute Inc., Cary, NC (US)

(72) Inventor: Wei Xiao, Seattle, WA (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/946,128

(22) Filed: Apr. 5, 2018

(65) Prior Publication Data

US 2018/0307731 A1    Oct. 25, 2018

Related U.S. Application Data

(60) Provisional application No. 62/488,676, filed on Apr. 21, 2017.

(51) Int. Cl.
*G06F 17/16* (2006.01)
*G06F 16/2455* (2019.01)
(Continued)

(52) U.S. Cl.
CPC ...... *G06F 16/24568* (2019.01); *G06F 16/221* (2019.01); *G06F 17/16* (2013.01);
(Continued)

(58) Field of Classification Search
CPC .............. G06F 17/30156; G06F 17/16; G06F 17/30315; G06F 16/24568; G06F 16/221; G06F 17/18; G06T 11/206; G06T 2200/24
See application file for complete search history.

(56) References Cited

U.S. PATENT DOCUMENTS

2008/0306899 A1* 12/2008 Gregory ............ G06F 17/30719
2011/0231405 A1*  9/2011 Herbrich ........... G06F 17/30525
                                                                707/748
(Continued)

OTHER PUBLICATIONS

Croux, Influence functions of the Spearman and Kendall correlation measures, May 12, 2010, Springer, pp. 497-515 (Year: 2010).*

(Continued)

*Primary Examiner* — Kris E Mackes
*Assistant Examiner* — Lin Lin M Htay
(74) *Attorney, Agent, or Firm* — Bell & Manning, LLC

(57) ABSTRACT

A data streaming environment provides a summary of streaming data from a sensor that is an Internet of things device. An input interface receives the streaming data. A processor is communicatively coupled to the input interface for processing the streaming data. The processed streaming data includes, but is not limited to, a plurality of records and variables that describe a characteristic of a physical object. A computer-readable medium has instructions stored thereon that, when executed by the processor, cause the processor to execute a correlation update application with the received streaming data to provide a correlation between two variables of the streaming data. The non-transitory computer-readable medium further stores sum and bin data for the correlation update application to compute the correlation. The output interface provides the processed streaming data to be visually presented in one or more data graphs on a display device.

30 Claims, 28 Drawing Sheets

(51) Int. Cl.
    G06F 16/22      (2019.01)
    G06F 17/18      (2006.01)
    G06T 11/20      (2006.01)
(52) U.S. Cl.
    CPC ............ *G06F 17/18* (2013.01); *G06T 11/206* (2013.01); *G06T 2200/24* (2013.01)

(56) References Cited

U.S. PATENT DOCUMENTS

2014/0280894 A1* 9/2014 Reynolds ............ H04L 43/0876
                                                709/224
2015/0288772 A1* 10/2015 Molettiere ............ H04L 67/22
                                                715/736

OTHER PUBLICATIONS

Rousseeuw et al., Robust Regression and Outlier Detection, 1$^{st}$ edition (1987) pp. 1-9, 248-273.
Huber et al., Robust Statistics 2nd edition, Feb. 2009, pp. 1-18.
J. Gama, Knowledge Discovery from Data Streams, May 25, 2010 pp. 158-160.
DataFlux Event Stream Processing Engine Primer, Version 1.3, Dec. 11, 2012.
DataFlux Event Stream Processing Engine User's Guide, Version 1.3, Jan. 24, 2013.
Kendall rank correlation coefficient, https://en.wikipedia.org/wiki/Kendall_rank_correlation_coefficient, Available Feb. 12, 2018.
Package 'Kendall', Feb. 19, 2015.
S. Mangiafico, An R Companion for the Handbook of Biological Statistics, May 19, 2017.
Significance Test for Kendall's Tau-b, R Tutorial, May 19, 2017.
Spearman Rank Correlation, May 19, 2017.
Spearman's rank correlation coefficient, https://en.wikipedia.org/wiki/Spearman%27s_rank_correlation_coefficient, Available Mar. 12, 2018.
Spearman's Rank-Order Correlation, May 19, 2017.
Measures of association in R—Kendall's tau-b and tau-c, May 19, 2017.
M. Gardener, Using R for statistical analyses—Simple correlation, May 19, 2017.
Franceschini et al., Divergence in latewood density response of Norway spruce to temperature is not resolved by enlarged sets of climatic predictors and their non-linearities, Agricultural and Forest Meteorology 180, 2013, pp. 132-141.
Zaman et al., Econometric applications of high-breakdown robust regression techniques, Economics Letters 71, 2001, pp. 1-8.
Munnix et al., Estimating correlation and covariance matrices by weighting of market similarity, arXiv:1006.5847v1, Jun. 30, 2010.
Croux et al., Influence functions of the Spearman and Kendall correlation measures, Stat Methods Appl 19, May 12, 2010, pp. 497-515.
N. Oza, Online Bagging and Boosting, Oct. 2005.
Xiao et al., Online Robust Principal Component Analysis with Change Point Detection, arXiv:1702.05698v2, Mar. 20, 2017.
Xiao et al., Robust regression for optimal individualized treatment rules, arXiv:1604.03648v1, Apr. 13, 2016.
Crammer et al., Ultraconservative Online Algorithms for Multiclass Problems, Journal of Machine Learning Research 3, 2003, pp. 951-991.
W. Knight, A computer method for calculating Kendall's tau with ungrouped data, Journal of the American Statistical Association, vol. 61, No. 314, Jun. 1966, pp. 436-439.
E.S. Fritz, Total Diet Comparison in Fishes by Spearman Rank Correlation Coefficients, Copeia, No. 1, Mar. 1974, pp. 210-214.
Xiaoming Huo, Fast Computing for Distance Covariance, Technometrics, 58:4, Oct. 11, 2014, pp. 1-38.

* cited by examiner

DATA PROCESSING WITH STREAMING DATA

CROSS-REFERENCE TO RELATED APPLICATIONS

The present application claims the benefit of 35 U.S.C. § 119(e) to U.S. Provisional Patent Application No. 62/488,676 filed Apr. 21, 2017, the entire contents of which are hereby incorporated by reference.

BACKGROUND

The need to summarize large amounts of data is a recurring problem in the area of streaming data analytics. Nonparametric correlations such as Spearman's rank correlation and Kendall's tau correlation are widely applied in scientific and engineering fields. However, computing nonparametric correlations on the fly for streaming data is problem. Standard batch algorithms are generally too slow to handle real-world big data applications. They also require too much memory because all of the data needs to be stored in memory before processing.

SUMMARY

In another example embodiment, a system is provided. The system includes, but is not limited to, a sensor, an input interface, a processor, a non-transitory computer-readable medium, and an output interface. The sensor is an Internet of things device. The input interface is configured to receive streaming data from the sensor or from an input device. The input device is configured to present a user interface. The processor is communicatively coupled to the input interface for processing the streaming data. The processed streaming data includes, but is not limited to, a plurality of records and variables that describe a characteristic of a physical object. The computer-readable medium has instructions stored thereon that, when executed by the processor, cause the processor to execute a correlation update application with the received streaming data to provide a correlation between two variables of the streaming data. The non-transitory computer-readable medium further stores sum and bin data for the correlation update application. The output interface is communicatively coupled to the processor to provide the processed streaming data to be visually presented in one or more data graphs on a display device.

In an example embodiment, a non-transitory computer-readable medium is provided having stored thereon computer-readable instructions that, when executed by a computing device, cause the computing device to iteratively update a correlation between measured quantities. A first value of a first variable is received from a first device connected to the computing device through a communication interface or through an input interface. A second value of a second variable is received from the first device connected to the computing device through the communication interface or through the input interface. A row index is determined based on the received first value and on first predefined variable bin boundaries. A column index is determined based on the received second value and on second predefined variable bin boundaries. A bin data value of bin data is incremented. The bin data value is selected based on the determined row index and the determined column index. A nonparametric correlation value is computed between the first variable and the second variable using the bin data. The computed nonparametric correlation value is output to a second device connected to the computing device through the communication interface or through the input interface.

In yet another example embodiment, a method of iteratively updating a correlation between measured quantities is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
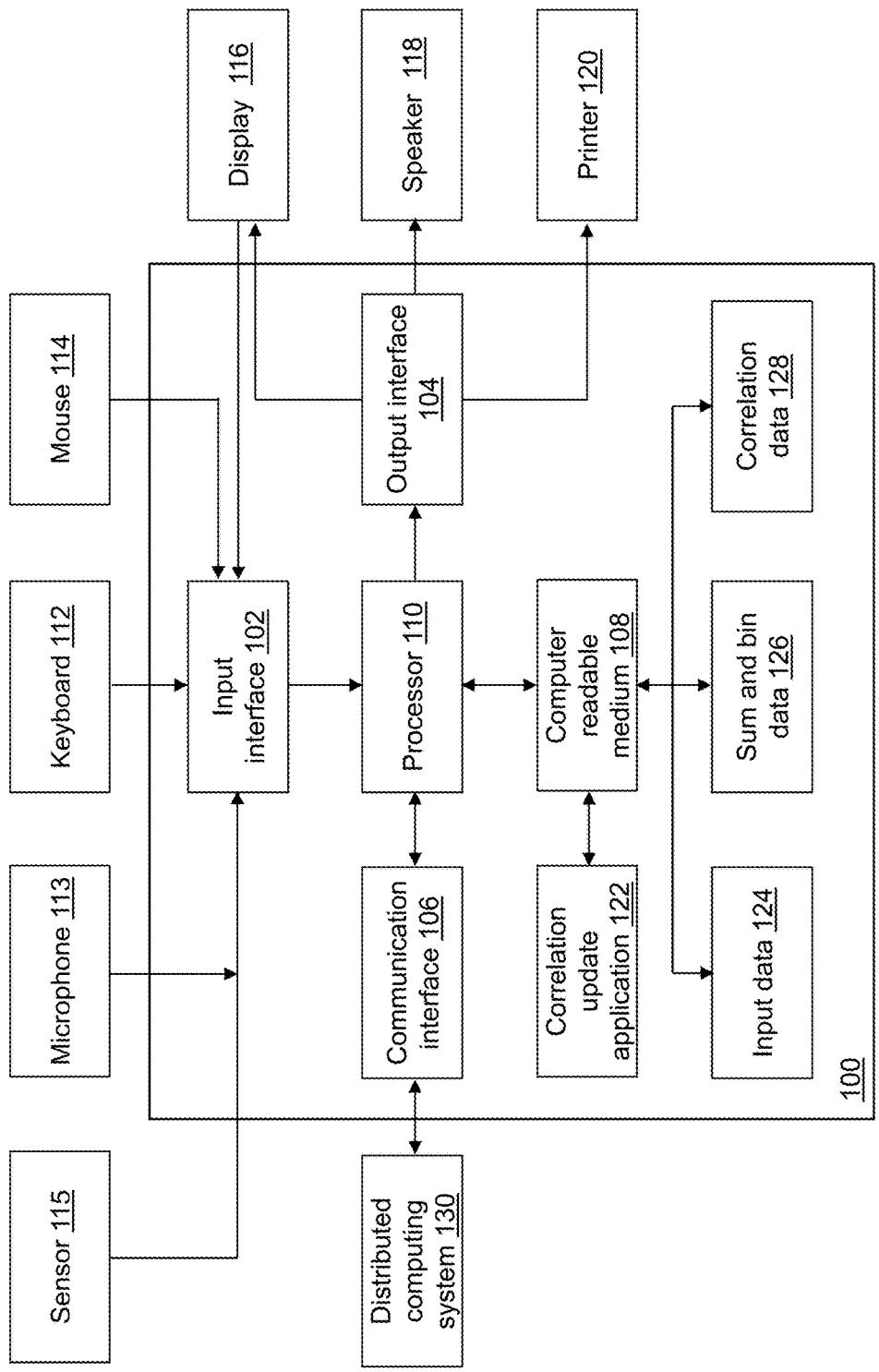
FIG. 1 depicts a block diagram of a correlation update device in accordance with an illustrative embodiment.

Robust statistics and related methods are widely applied in a variety of technical fields. Nonparametric correlations such as Spearman's rank (SR) correlation and Kendall's tau (KT) correlation are commonly used robust statistics and are often used as a replacement of the classic Pearson correlation to measure the relationship between two random variables when the data contain outliers or comes from a heavy-tailed distribution. Examples include estimating a correlation structure of financial returns, comparing diets of fish, studying a relationship between summer temperature and latewood density in trees, etc. Thus, nonparametric correlations have application in many scientific and engineering technology areas.

Nonparametric correlations have the following beneficial properties that the standard Pearson correlation does not possess. First, nonparametric correlations can work on incomplete data (where only ordinal information of the data is available). Second, the SR correlation and the KT correlation values equal one when a second variable is a monotonically increasing function of a first variable. Third, the SR correlation and the KT correlation are more robust against outliers or heavy-tailed errors. The SR correlation and the KT correlation values being equal to one when a second variable is a monotonically increasing function of a first variable because if Y is a monotonically increasing function of X, a bigger value of X always associates with a bigger value of Y, and (X, Y) are perfectly positively correlated. SR and KT correlations result in a value of one, while the Pearson correlation is not guaranteed to return a value of one. However, a correlation equal to one is the most reasonable value for such cases.

One drawback of the SR correlation and the KT correlation compared with the Pearson correlation is that they require more computation time because the SR correlation and the KT correlation require sorting (finding a rank) of the first variable and of the second variable sequences, which is a very time-consuming step when the sample size n is large. The minimum time complexities for batch algorithms computing the SR correlation and the KT correlation are $O(n \log n)$, whereas the time complexity for a batch algorithm computing the Pearson correlation is only $O(n)$. Additionally, in practice, correlation analysis between variables in dynamic environments, where the data is streaming in, is needed. These environments include network monitoring, sensor networks, financial analysis, etc.

When working with streaming data, a one-pass algorithm that can keep a limited-size summary of an unlimited amount of streaming data points is needed. Bin data is a good way to summarize the streaming data because the distribution of the data is tracked without storing all of the data points. However, when the range of the data is unknown beforehand, a flexible representation of the bin data having a predefined number of bins is needed.

In a streaming environment, it is also beneficial to have a mechanism that forgets (fades) outdated data thereby providing more relevance to the most recent data. A sliding window can be used as a way to forget the data that is outside the sliding window.

A streaming algorithm exists to compute the Pearson correlation using the idea of sufficient statistics. The time complexity of this algorithm is $O(1)$, and its memory cost is also $O(1)$. However, as already explained, the Pearson correlation is not robust against outliers, making it undesirable for some applications. For example, correlation analysis may be needed of data collected from a huge sensor network of a complex system to detect highly correlated sensor pairs. Outliers in sensor readings may occur due to noise, different temperature conditions, sensor failure, communication failure, etc. The Pearson correlation is not robust enough to handle such an analysis.

The method by which the Pearson correlation is computed cannot be applied to computation of the SR correlation or the KT correlation. For the SR correlation computation, new data can change the rank of all historical observations used to compute the correlation. For the KT correlation computation, new data is compared with all historical data. To exactly compute the SR correlation and the KT correlation with streaming data using existing algorithms, it is necessary to keep all previous data in memory, which is impossible because the data streams can be unbounded in length.

Referring to FIG. 1, a block diagram of a correlation update device 100 is shown in accordance with an illustrative embodiment that flexibly solves the issues associated with computation of the SR correlation and the KT correlation particularly when the number of data points is large and/or data is streamed. Correlation update device 100 may include an input interface 102, an output interface 104, a communication interface 106, a non-transitory computer-readable medium 108, a processor 110, a correlation update application 122, input data 124, sum and bin data 126, and correlation data 128. Fewer, different, and/or additional components may be incorporated into correlation update device 100.

Input interface 102 provides an interface for receiving information from the user or another device for entry into correlation update device 100 as understood by those skilled in the art. Input interface 102 may interface with various input technologies including, but not limited to, a keyboard 112, a microphone 113, a mouse 114, a sensor 115, a display 116, a track ball, a keypad, one or more buttons, etc. to allow the user to enter information into correlation update device 100 or to make selections presented in a user interface displayed on display 116. The same interface may support both input interface 102 and output interface 104. For example, display 116 comprising a touch screen provides a mechanism for user input and for presentation of output to the user. Correlation update device 100 may have one or more input interfaces that use the same or a different input interface technology. The input interface technology further may be accessible by correlation update device 100 through communication interface 106.

Output interface 104 provides an interface for outputting information for review by a user of correlation update device 100 and/or for use by another application or device. For example, output interface 104 may interface with various output technologies including, but not limited to, display 116, a speaker 118, a printer 120, etc. Correlation update device 100 may have one or more output interfaces that use the same or a different output interface technology. The output interface technology further may be accessible by correlation update device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Correlation update device 100 may have one or more communication interfaces that use the same or a different communication interface technology. For example, correlation update device 100 may support communication using an Ethernet port, a Bluetooth antenna, a telephone jack, a USB port, etc. Data and messages may be transferred between correlation update device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. correlation update device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Correlation update device 100 also may have one or more drives that support the loading of a memory media such as a CD, DVD, an external hard drive, etc. One or more external hard drives further may be connected to correlation update device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Correlation update device 100 may include a plurality of processors that use the same or a different processing technology.

Correlation update application 122 performs operations associated with computing and updating sum and bin data 126 and correlation data 128 from input data 124 that may be stored locally and/or on distributed computing system 130 or may be streamed to correlation update device 100 from distributed computing system 130 and/or sensor 115 and/or another computing device or other type of device. Sum and bin data 126 are used to compute updated correlation data 128 from input data 124 as additional data is received and/or processed. Some or all of the operations described herein may be embodied in correlation update application 122. The operations may be implemented using hardware, firmware, software, or any combination of these methods.

Referring to the example embodiment of FIG. 1, correlation update application 122 is implemented in software (comprised of computer-readable and/or computer-executable instructions) stored in computer-readable medium 108 and accessible by processor 110 for execution of the instructions that embody the operations of correlation update application 122. Correlation update application 122 may be written using one or more programming languages, assembly languages, scripting languages, etc. Correlation update application 122 may be integrated with other analytic tools. As an example, correlation update application 122 may be part of an integrated data analytics software application and/or software architecture such as that offered by SAS Institute Inc. of Cary, N.C., USA. For example, correlation update application 122 may be integrated with one or more SAS software tools such as SAS® Enterprise Miner™, SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing (ESP) all of which are developed and provided by SAS Institute Inc. of Cary, N.C., USA. Data mining and data analytics is applicable in a wide variety of industries. Merely for illustration, correlation update application 122 may be implemented as a plug-in to SAS ESP.

Correlation update application 122 may be integrated with other system processing tools to automatically process data generated as part of operation of an enterprise, device, system, facility, etc., to monitor changes in input data 124 and to provide a warning or alert associated with the monitored data using input interface 102, output interface 104, and/or communication interface 106 so that appropriate action can be initiated in response to changes in the monitored data.

Correlation update application 122 may be implemented as a Web application. For example, correlation update application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input data 124 may include a plurality of rows and a plurality of columns. The plurality of rows may be referred to as observation vectors or records (observations), and the columns may be referred to as variables. Input data 124 may be transposed. The plurality of variables may define multiple dimensions for each observation vector. An observation vector $x_i$ may include a value for each of the plurality of variables associated with the observation i, where i=1, . . . , T, where T is a number of observations in input data 124. Observations in input data 124 may be deleted after processing by correlation update application 122 to reduce a memory footprint, for example, when the data stored in input data 124 is streamed to correlation update device 100 or otherwise continues to grow in size.

Each variable of the plurality of variables may describe a characteristic of a physical object. For example, if input data 124 includes data related to operation of a vehicle, the variables may include an oil pressure, a speed, a gear indicator, a gas tank level, a tire pressure for each tire, an engine temperature, a radiator level, etc. that may be captured by one or more sensors 115. Input data 124 may include data captured as a function of time for one or more physical objects. Each observation vector $x_i$ includes observation vector values $o_{i,l}$, where l=1, . . . , v i=1, . . . , T, where v is a number of the plurality of variables that make up each observation vector in input data 124.

Input data 124 may be generated by and/or captured from a variety of sources including the one or more sensors 115 of the same or different type, one or more computing devices, other types of devices, etc. Input data 124 may be received directly or indirectly from the source and may or may not be pre-processed in some manner. For example, input data 124 may be pre-processed using an event stream processor such as the SAS® Event Stream Processing Engine (ESPE), developed and provided by SAS Institute Inc. of Cary, N.C., USA. As used herein, input data 124 may include any type of content represented in any computer-readable format such as binary, alphanumeric, numeric, string, markup language, etc. Input data 124 may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input data 124 may be stored on computer-readable medium 108 and/or on one or more computer-readable media of distributed computing system 130 and accessed by or received by correlation update device 100 using communication interface 106, input interface 102, and/or output interface 104. Input data 124 may include sensor measurements or signal values captured by a sensor, may be generated or captured in response to occurrence of an event or a transaction, generated by a device such as in response to an interaction by a user with the device, etc. Input data 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Input data 124 may be captured at different time points periodically, intermittently, when an event occurs, etc. One or more columns of input data 124 may include a time value and/or a date value.

Input data 124 may include data captured at a high data rate such as 200 or more observations per second for one or more physical objects. For example, input data 124 may be generated as part of the Internet of Things (IoT), where things (e.g., machines, devices, phones, sensors) can be connected to networks and the data from these things collected and processed within the things and/or external to the things before being stored as input data 124. For example, the IoT can include sensors 115 in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input data 124 or transmitted to correlation update device 100. As discussed further below, an ESPE may be instantiated at correlation update device 100 to receive input data 124.

Input data 124 may be stored using various data structures as known to those skilled in the art including one or more files of a file system, a relational database, one or more tables of a system of tables, a structured query language database, etc. on correlation update device 100 or on distributed computing system 130 that may be the same or different. Correlation update device 100 may coordinate access to input data 124 that is distributed across distributed computing system 130 that may include one or more computing devices. For example, input data 124 may be stored in a cube distributed across a grid of computers as understood by a person of skill in the art. As another example, input data 124 may be stored in a multi-node Hadoop® cluster. For instance, Apache™ Hadoop® is an open-source software framework for distributed computing supported by the Apache Software Foundation. As another example, input data 124 may be stored in a cloud of computers and accessed using cloud computing technologies, as understood by a person of skill in the art. The SAS® LASR™ Analytic Server may be used as an analytic platform to enable multiple users to concurrently access data stored in input data 124. The SAS® Viya™ open, cloud-ready, in-memory architecture also may be used as an analytic platform to enable multiple users to concurrently access data stored in input data 124. Some systems may use SAS In-Memory Statistics for Hadoop® to read big data once and analyze it several times by persisting it in-memory for the entire session. Some systems may be of other types and configurations.

Referring to FIGS. 2A, 2B, 2C, 2D, 2E, and 2F, example operations associated with correlation update application 122 are described. For example, correlation update application 122 may be used to compute sum and bin data 126 and correlation data 128 from input data 124. Additional, fewer, or different operations may be performed depending on the embodiment of correlation update application 122. The order of presentation of the operations of 2A, 2B, 2C, 2D, 2E, and 2F is not intended to be limiting. Although some of the operational flows are presented in sequence, the various operations may be performed in various repetitions, concurrently (in parallel, for example, using threads and/or distributed computing system 130), and/or in other orders than those that are illustrated. For example, a user may execute correlation update application 122, which causes presentation of a first user interface window, which may include a plurality of menus and selectors such as drop-down menus, buttons, text boxes, hyperlinks, etc. associated with correlation update application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by correlation update application 122. For example, instead of receiving input through a user interface, the input may be read from a file stored on computer-readable medium 108 and/or on distributed computing system 130.

Figure 2A:
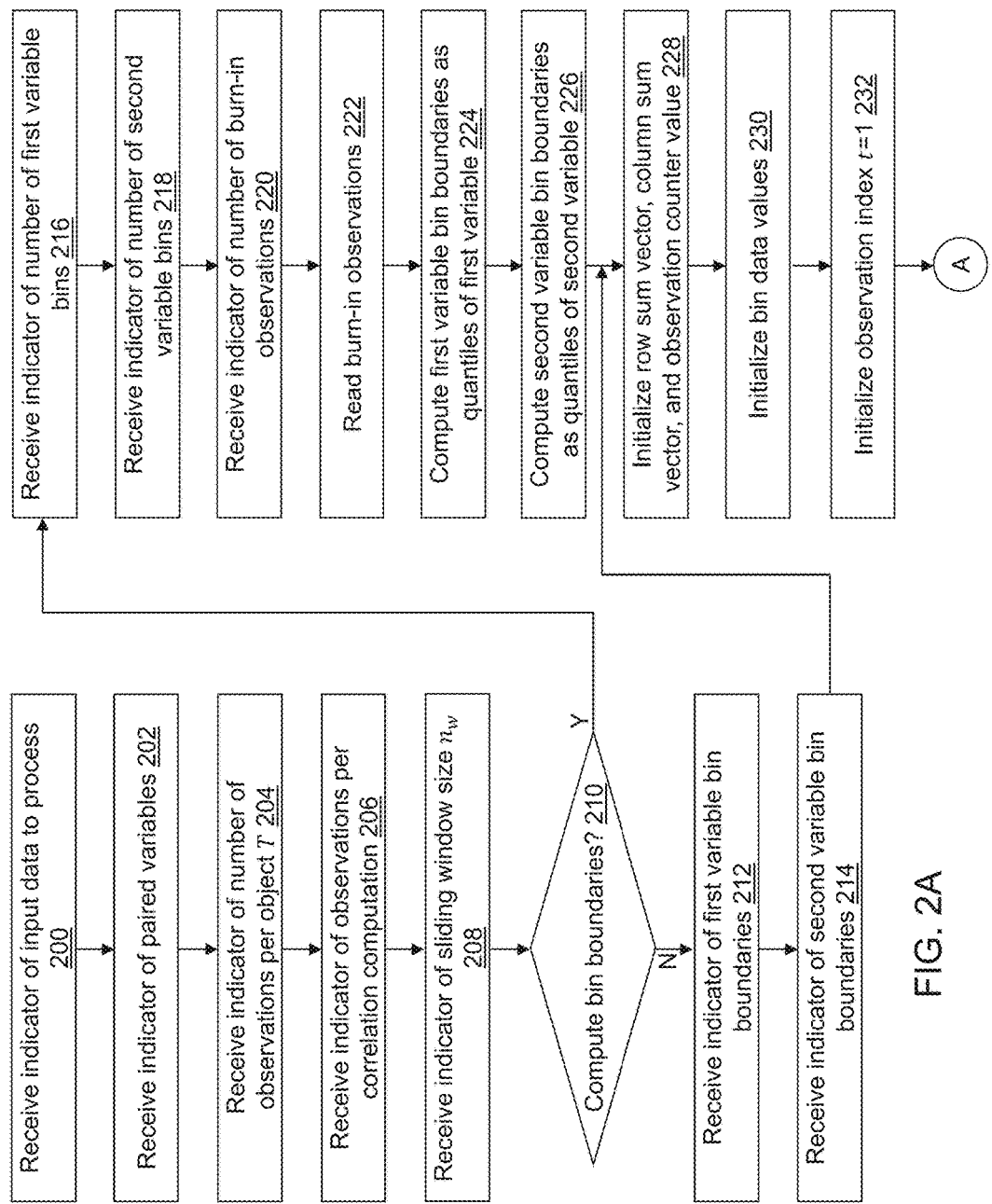
FIGS. 2A, 2B, 2C, 2D, 2E, and 2F depict a flow diagram illustrating examples of operations performed by the correlation update device of FIG. 1 in accordance with an illustrative embodiment.

Referring to FIG. 2A, in an operation 200, a first indicator may be received that indicates input data 124. The first indicator may indicate a location and a name of input data 124. As an example, the first indicator may be received by correlation update application 122 after selection from a user interface window or after entry by a user into a user interface window. In an alternative embodiment, input data 124 may not be selectable. For example, a most recently created dataset may be used automatically. For example, a grid, a cube, a cloud, a Hadoop® cluster, a relational database, a file system, etc. location may be used automatically as a location/name of input data 124. As another example, input data 124 may be streamed to correlation update device 100.

In operation 202, a second indicator may be received that indicates a pair of variables (a first variable and a second variable) of input data 124, for which to compute correlation data 128 using sum and bin data 126. A plurality of pairs of variables may be monitored with each pair of variables having an associated sum and bin data 126 and correlation data 128. The second indicator may indicate a column name or column number of each variable of the pair of variables. As an example, the second indicator may be received by correlation update application 122 after selection from a user interface window or after entry by a user into a user interface window. A first pair of columns may be used by default if no variable selection is indicated by the second indicator.

In an operation 204, a third indicator may be received that indicates a number of observations per object T processed as a group. For example, a user may interact with a user interface to select or enter the number of observations per object T, where $T \geq 1$. In an alternative embodiment, the third indicator may not be received. For example, a default value may be stored, for example, in computer-readable medium 108 and used automatically. For example, the number of observations per object T may be determined based on a number of observations stored in input data 124. The number of observations per object T further may be determined based on a number of observations stored in a received event block object or otherwise define a number of observations received in one or more event block objects that are accumulated for processing as a group.

In an operation 206, a fourth indicator may be received that indicates a number of observations per correlation computation $n_g$. For example, a user may interact with a user interface to select or enter the number of observations per correlation computation $n_g$, where $n_g \geq 1$. In an alternative embodiment, the fourth indicator may not be received. For example, a default value may be stored, for example, in computer-readable medium 108 and used automatically. The default value may be $n_g=1$.

In an operation 208, a fifth indicator may be received that indicates a sliding window size $n_w$. For example, a user may interact with a user interface to select or enter the sliding window size $n_w$, where $n_w \geq 1$. In an alternative embodiment, the fifth indicator may not be received. For example, a default value may be stored, for example, in computer-readable medium 108 and used automatically. The default value may be $n_w=1$, which is used to indicate that sliding windows are not used.

In an operation 210, a determination is made concerning whether or not bin boundaries are input or computed. For example, a user may interact with a user interface to select or enter an indicator that indicates whether or not bin boundaries are input or computed. When bin boundaries are computed, processing continues in an operation 216. When bin boundaries are input, processing continues in an operation 212.

In operation 212, a sixth indicator may be received that indicates first variable internal bin boundary points $C_1^x, C_2^x, \ldots, C_{m1}^x$, where $C_1^x < C_2^x < \ldots < C_{m1}^x$, and m1' is a number of first variable internal bin boundary points. For example, a user may interact with a user interface to select or enter the first variable internal bin boundary points $C_1^x, C_2^x, \ldots, C_{m1}^x$. Additional external bin boundaries $C_0^x$ and $C_{m1'+1}^x$ may be created by default such that $C_0^x = -\infty$ and $C_{m1'+1}^x = \infty$ to define m1=m1'+1 first variable bins. The m1 first variable bins discretize a first variable of the paired variables indicated in operation 202 into m1 ranges.

Figure 3:
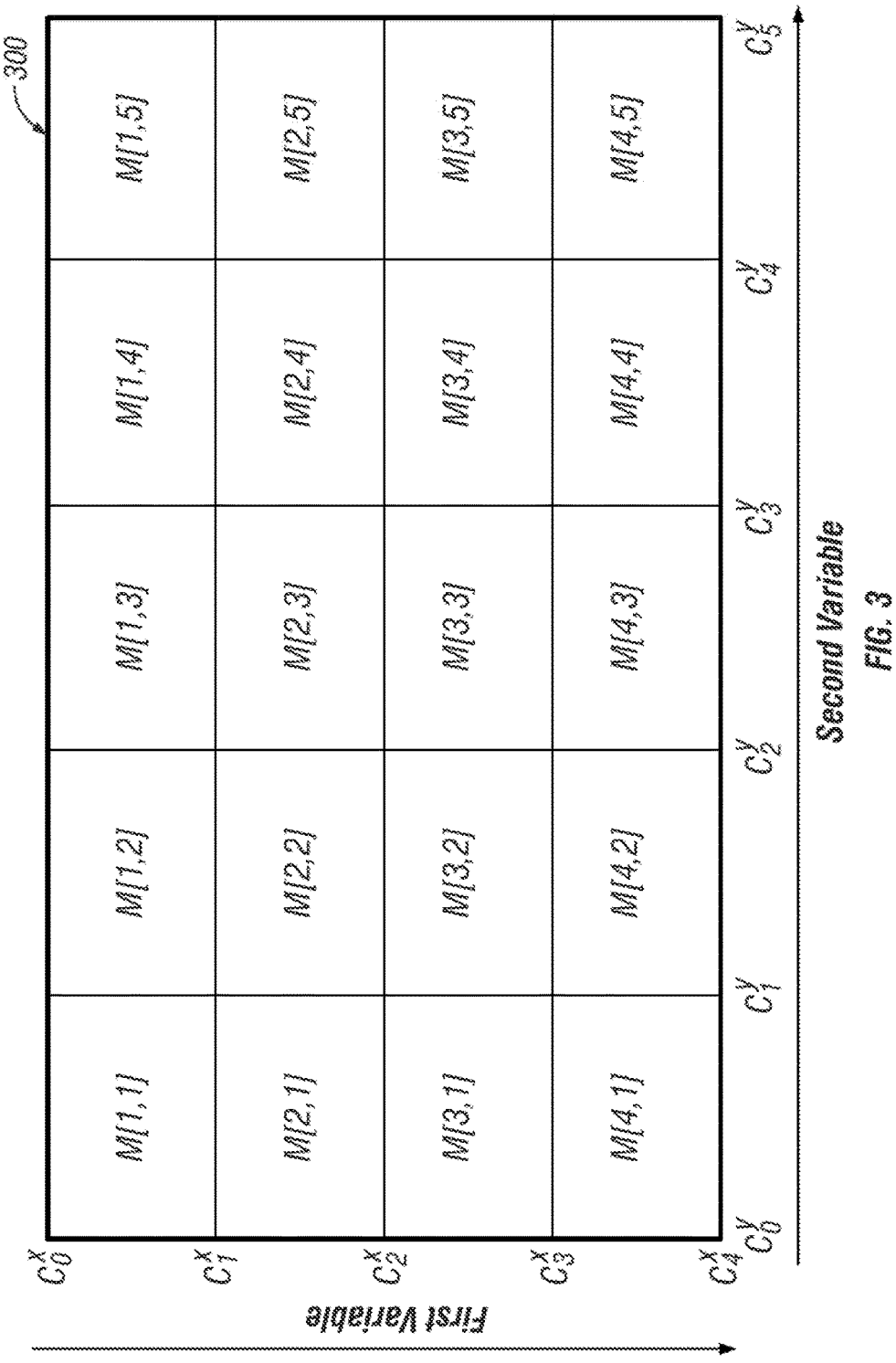
FIG. 3 depicts a bin matrix maintained by the correlation update device of FIG. 1 in accordance with an illustrative embodiment.

In an operation 214, a seventh indicator may be received that indicates second variable internal bin boundary points $C_1^y, C_2^y, \ldots, C_{m2}^y$ where $C_1^y < C_2^y < \ldots < C_{m2}^y$, and m2' is a number of second variable internal bin boundary points, and processing continues in an operation 228. For example, a user may interact with a user interface to select or enter the second variable internal bin boundary points $C_1^y, C_2^y, \ldots, C_{m2}^y$. Additional external bin boundaries $C_0^y$ and $C_{m2+1}^y$ may be created by default such that $C_0^y = -\infty$ and $C_{m2'+1}^y = \infty$ to define m2=m2'+1 second variable bins. The m2 second variable bins discretize a second variable of the paired variables indicated in operation 202 into m2 ranges. For illustration, referring to FIG. 3, a bin matrix 300 can be defined based on m1=4 and m2=5 to define $C_0^x, C_1^x, C_2^x, C_3^x, C_4^x$ based on input values $C_1^x, C_2^x, C_3^x$ defined using the sixth indicator and to define $C_0^y, C_1^y, C_2^y, C_3^y, C_4^y, C_4^y$ based on input values $C_1^y, C_2^y, C_3^y, C_4^y$ defined using the seventh indicator.

Referring again to FIG. 2A, in operation 216, an eighth indicator may be received that indicates the number of first variable internal bin boundary points m1'. For example, a user may interact with a user interface to select or enter the number of first variable internal bin boundary points m1'. In an alternative embodiment, the eighth indicator may not be received. For example, a default value may be stored, for example, in computer-readable medium 108 and used automatically.

In operation 218, a ninth indicator may be received that indicates the number of second variable internal bin boundary points m2'. For example, a user may interact with a user interface to select or enter the number of i second variable internal bin boundary points m2'. In an alternative embodiment, the ninth indicator may not be received. For example, a default value may be stored, for example, in computer-readable medium 108 and used automatically.

In an operation 220, a tenth indicator may be received that indicates a number of burn-in observations $N_{bi}$. For example, a user may interact with a user interface to select or enter the number of burn-in observations $N_{bi}$. In an alternative embodiment, the tenth indicator may not be received. For example, a default value may be stored, for example, in computer-readable medium 108 and used automatically. The default value may be $N_{bi}$=100. As another example, the number of burn-in observations $N_{bi}$ may not be a separate input parameter. Instead, $N_{bi}$=T may be used.

In an operation 222, a first variable value x and a second variable value y of the paired variables indicated in operation 202 are read from input data 124 for each of the number of burn-in observations $N_{bi}$. The first variable value x and the second variable value y for each of the number of burn-in observations $N_{bi}$ may be streamed to correlation update device 100.

In an operation 224, m1' quantiles are computed from the read/received $N_{bi}$ first variable values x to define $C_1^x, C_2^x, \ldots, C_{m1'}^x$. Again, C $C_0^x=-\infty$ and $C_{m1'+1}^x=\infty$ define m1=m1'+1 first variable bins. The m1' quantiles may be computed as equally spaced quantiles determined based on m1' assuming a standard normal distribution. For illustration, the quantiles may be computed using an algorithm such as that described in U.S. patent application Ser. No. 15/849,870, titled ANALYTIC SYSTEM FOR FAST QUANTILE REGRESSION COMPUTATION, filed Dec. 21, 2017, and assigned to the assignee SAS Institute Inc. as the present application.

In an operation 226, m2' quantiles are computed from the read/received $N_{bi}$ second variable values y to define $C_1^y, C_2^y, \ldots, C_{m2'}^y$. Again, C $C_0^y=-\infty$ and $C_{m2'+1}^y=\infty$ define m2=m2'+1 second variable bins.

In operation 228, a row sum vector $n_r[m1]$ is initialized to all zeros, a column sum vector $n_c[m2]$ is initialized to all zeros, and an observation counter value n is initialized to zero. Row sum vector $n_r[m1]$, column sum vector $n_c[m2]$, and observation counter value n may be referred to as sum data that may be stored in sum and bin data 126.

In an operation 230, bin data values are initialized to all zeros. The bin data M may be stored using a variety of data structures. For illustration, the bin data values may be stored as bin matrix 300 shown referring to FIG. 3, where row sum vector $n_r=[i]=\Sigma_{j=1}^{m2} M[i,j]$ of each row i=1, . . . , m1 of bin data M, column sum vector $n_c[j]=\Sigma_{i=1}^{m1} M[i,j]$ of each column j=1, . . . , m2 of bin data M, and $n=\Sigma_{i=1}^{m1}\Sigma_{j=1}^{m2} M[i,j]$.

In an operation 232, an observation index t is initialized to one.

Figure 2B:
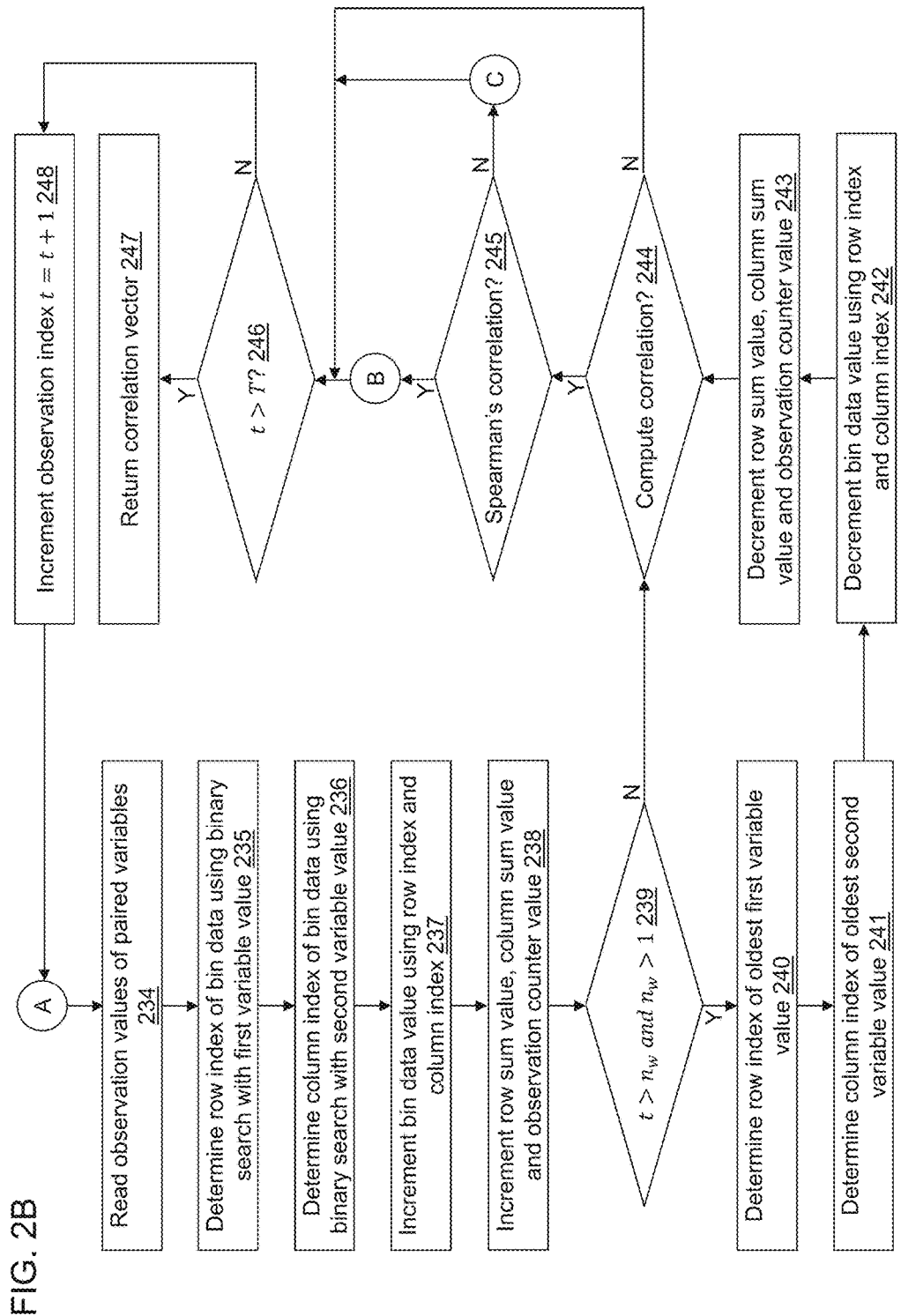

Referring to FIG. 2B, in an operation 234, a $t^{th}$ first variable value x and a $t^{th}$ second variable value y of the paired variables indicated in operation 202 are read from input data 124. The number of burn-in observations $N_{bi}$ optionally read from input data 124 in operation 222 may or may not be skipped such that, on a first iteration of operation 234, the $t^{th}$ first variable value x and the $t^{th}$ second variable value y are a first observation of input data 124 or are a first observation of input data 124 after the number of burn-in observations $N_{bi}$. When a plurality of pairs of variables are indicated in operation 202, additional paired values may be read. Operations 235 to 247 may be performed for each pair of variables of the plurality of pairs of variables indicated in operation 202 before performance of an operation 248.

In an operation 235, a row index i for the first variable value x is determined using a binary search of M[m1, m2].

In an operation 236, a column index j for the second variable value y is determined using a binary search of M[m1, m2].

In an operation 237, M[i,j]=M[i,j]+1.

In an operation 238, $n_r[i]=n_r[i]+1$, $n_c[j]=n_c[j]+1$, and n=n+1.

In an operation 239, a determination is made concerning whether or not $t>n_w$ and $n_w>1$, where $n_w>1$ indicates that sliding windows are used. When $t>n_w$ and $n_w>1$, processing continues in an operation 240. When $t\leq n_w$ or $n_w\leq 1$, processing continues in an operation 244.

In an operation 240, a row index i for an oldest first variable value $x_o$ is determined using a binary search of M[m1, m2]. When $n_w>1$, first variable values may be stored in a first variable array $f_x[n_w]$ such that the oldest first variable value $x_o=f_x[1]$. First variable array $f_x[n_w]$ may be re-indexed ($f_x[1]=f_x[2], f_x[2]=f_x[3], \ldots, f_x[n_w]=x$).

In an operation 241, a column index j for an oldest second variable value $y_o$ is determined using a binary search of M[m1, m2]. When $n_w>1$, second variable values may be stored in second variable array $f_y[n_w]$ such that the oldest second variable value $y_o=f_y[1]$. Second variable array $f_y[n_w]$ may be re-indexed ($f_y[1]=f_y[2], f_y[2]=f_y[3], \ldots, f_y[n_w]=y$).

In an operation 242, M[i,j]=M[i,j]−1.

In an operation 243, $n_r[i]=n_r[i]-1$, $n_c[j]=n_c[j]-1$, and n=n−1.

In operation 244, a determination is made concerning whether or not an updated correlation should be computed based on the number of observations per correlation computation $n_g$. When t mod $n_g$=0, processing continues in an operation 245. When t mod $n_g\neq 0$, processing continues in an operation 246. The update of M[i,j] is done very efficiently with time complexity O(max (log m1, log m2)) in operations 234 to 244. When T is not evenly divisible by $n_g$, when t=T, processing continues in operation 245 to compute an updated correlation for a last observation.

In operation 245, a determination is made concerning whether or not a Spearman's rank or a Kendall's tau correlation is to be computed. In an alternative embodiment, both a Spearman's rank and a Kendall's tau correlation may be computed. When the Spearman's rank correlation is to be computed, processing continues in an operation 250 shown referring to FIG. 2C. When the Kendall's tau correlation is to be computed, processing continues in an operation 270 shown referring to FIG. 2E. As described further below, the Spearman's rank and the Kendall's tau correlation computation are done with time complexity O(m1m2).

After computing either or both correlation values, processing continues in an operation 246. In operation 246, a determination is made concerning whether or not t>T indicating that the number of observations per object T to be processed as a group have been processed. When t>T, processing continues in an operation 247. When t≤T, processing continues in operation 248.

In operation 247, a correlation vector is returned that includes a computed correlation value for each iteration of operation 245. Of course, if both were computed, the correlation vector includes two computed correlation values for each iteration of operation 245. The computed correlation value(s) for each iteration of operation 245 may be output. For example, the computed correlation value(s) may be stored in correlation data 128 on computer-readable medium 108, may be stored in correlation data 128 on another computer-readable medium of distributed computing system 130, may be output to display 126, may be sent to another computing device of distributed computing system 130 using input interface 102 or communication interface 106, may be printed on printer 120, etc.

When a next number of observations per object T is received, processing may continue in operation 232 to continually update the correlation values. For example, input data 124 may be replaced each time the next number of observations per object T is received to keep a memory usage of computer-readable medium 108 from continually expanding.

In operation 248, t=t+1, and processing continues in operation 234.

Figure 2C:
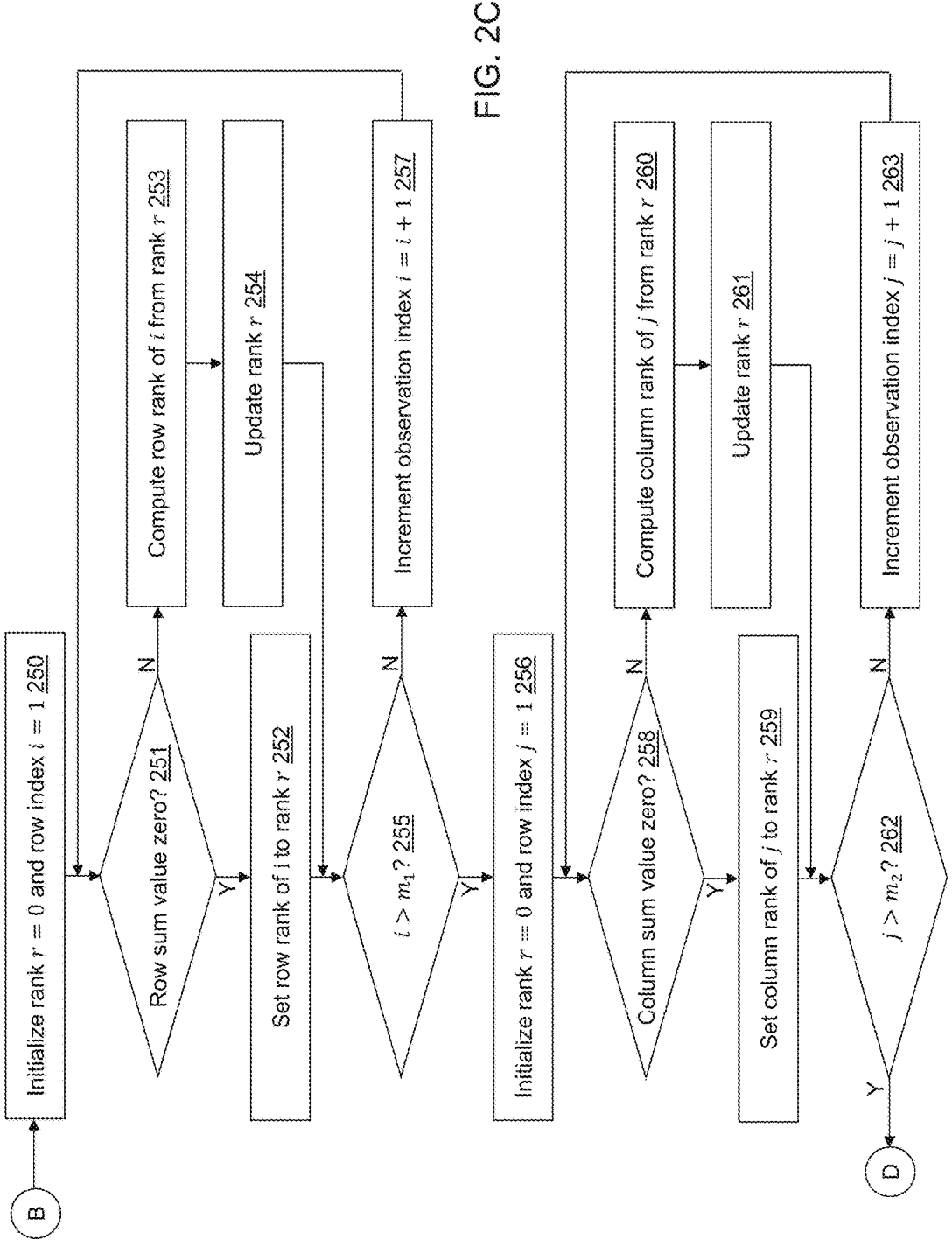
Figure 2D:
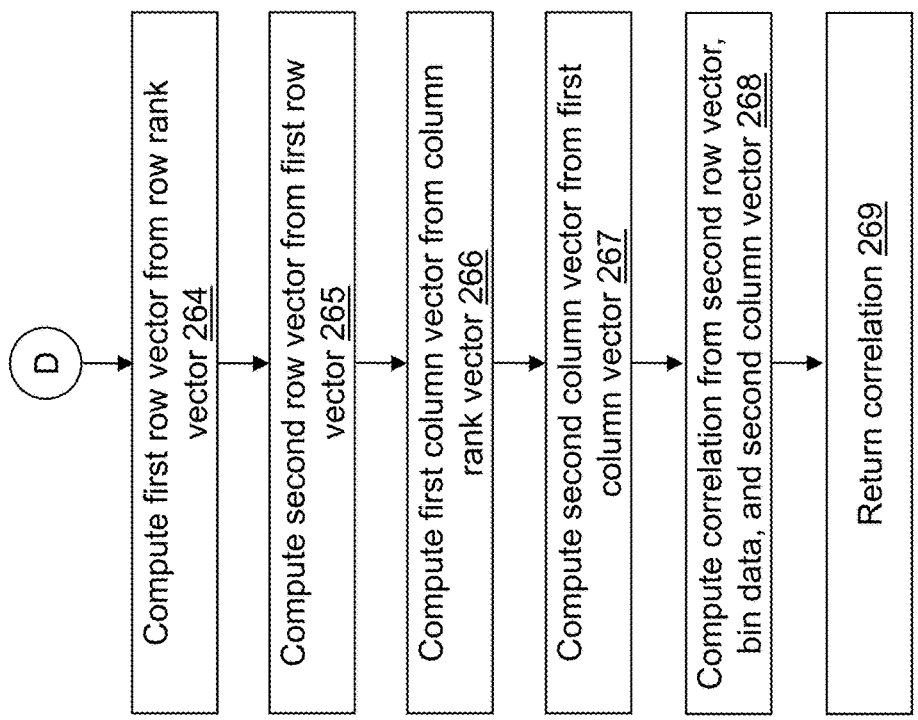

FIGS. 2C and 2D describe computation of a Spearman's rank correlation value. Referring to FIG. 2C, in operation 250, a rank r is initialized to zero, and a row index i is initialized to one.

In an operation 251, a determination is made concerning whether or not $n_r[i]=0$. When $n_r[i]=0$, processing continues in an operation 252. When $n_r[i] \neq 0$, processing continues in an operation 253.

In operation 252, a row rank vector $r_r[i]=r$, and processing continues in an operation 255.

In operation 253, the row rank vector $r_r[i]=[(r+1)+(r+n_r[i])]/2$.

In an operation 254, $r=r+n_r[i]$, and processing continues in operation 255.

In operation 255, a determination is made concerning whether or not i>m1 indicating that all of the rows have been processed. When i>m1, processing continues in an operation 256. When i≤m1, processing continues in an operation 257.

In operation 256, a rank r is re-initialized to zero, and the column index j is initialized to one, and processing continues in an operation 258.

In operation 257, i=i+1, and processing continues in operation 251.

In an operation 258, a determination is made concerning whether or not $n_c[j]=0$. When $n_c[j]=0$, processing continues in an operation 259. When $n_c[j] \neq 0$, processing continues in an operation 260.

In operation 259, a column rank vector $r_c[j]=r$, and processing continues in an operation 262.

In operation 260, the column rank vector $r_c[j]=[(r+1)+(r+n_c[j])]/2$.

In an operation 261, $r=r+n_c[j]$, and processing continues in operation 262.

In operation 262, a determination is made concerning whether or not j>m2 indicating that all of the columns have been processed. When j>m2, processing continues in an operation 264 shown referring to FIG. 2D. When j≤m2, processing continues in an operation 263.

In operation 263, j=j+1, and processing continues in operation 258.

Referring to FIG. 2D, in operation 264, a first row vector $r_{1r}[i]$ is computed from the row rank vector $r_r[i]$ using $r_{1r}[i]=r_r[i]-(n+1)/2$.

In an operation 265, a second row vector $r_{2r}[i]$ is computed from the first row vector $r_{1r}[i]$ using $r_{2r}[i]=r_{1r}[i]/C_1$, where $C_1=\sqrt{\Sigma_{i=1}^{m1} n_r[i](r_{1r}[i])^2}$.

In an operation 266, a first column vector $r_{1c}[j]$ is computed from the column rank vector $r_c[j]$ using $r_{1c}[j]=r_c[j]-(n+1)/2$.

In an operation 267, a second column vector $r_{2c}[j]$ is computed from the first column vector $r_{1c}[j]$ using $r_{2c}[j]=r_{1c}[j]/C_2$, where $C_2=\sqrt{\Sigma_{j=1}^{m2} n_c[j](r_{1c}[j])^2}$.

In an operation 268, a correlation value $c_S$ is computed using $c_S=r_{2r}^T M r_{2c}$.

In operation 269, the computed correlation value $c_S$ is returned and processing continues in operation 246 shown referring to FIG. 2B or in operation 270 to also compute the Kendall's tau correlation value.

Figure 2E:
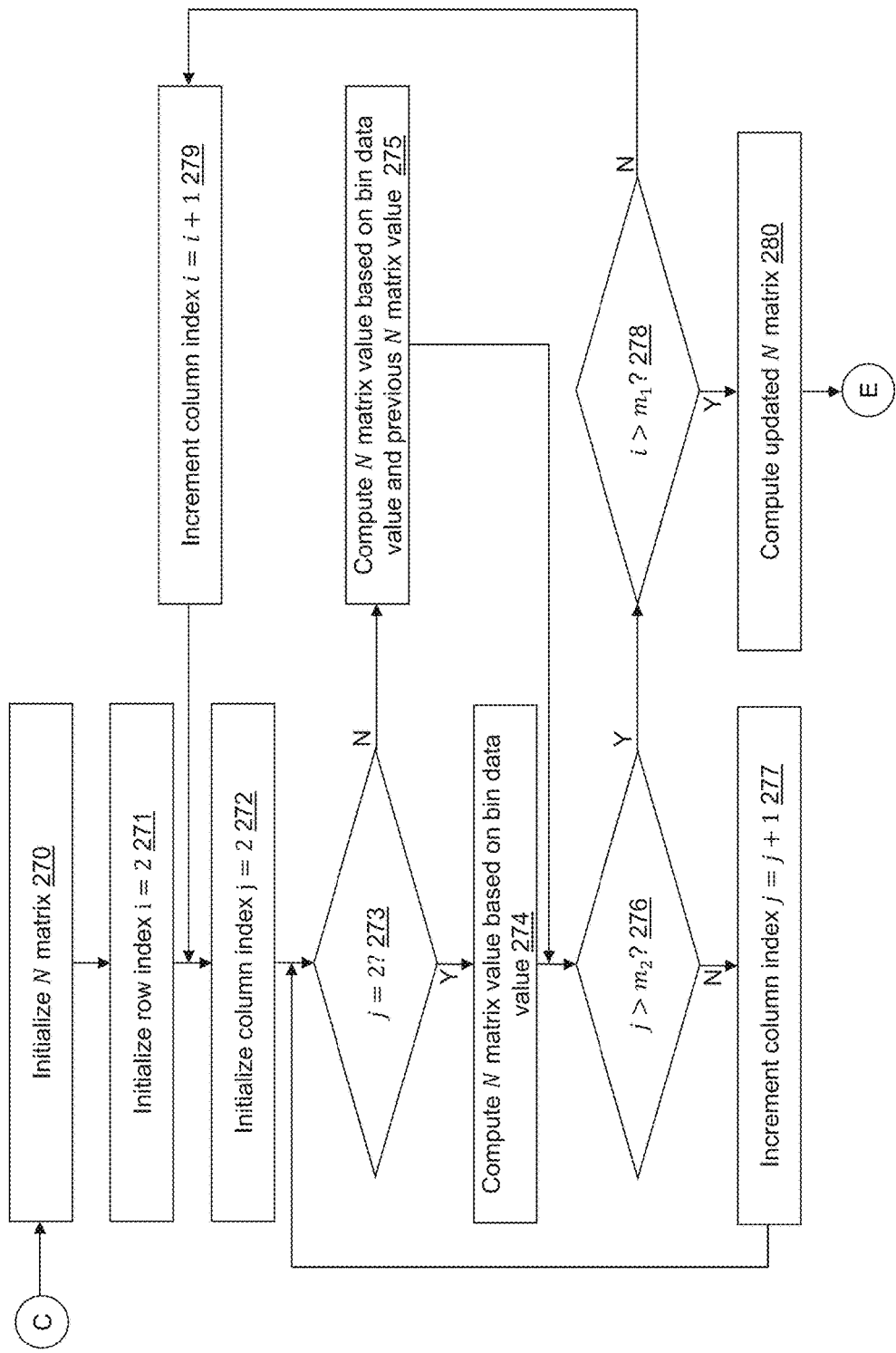
Figure 2F:
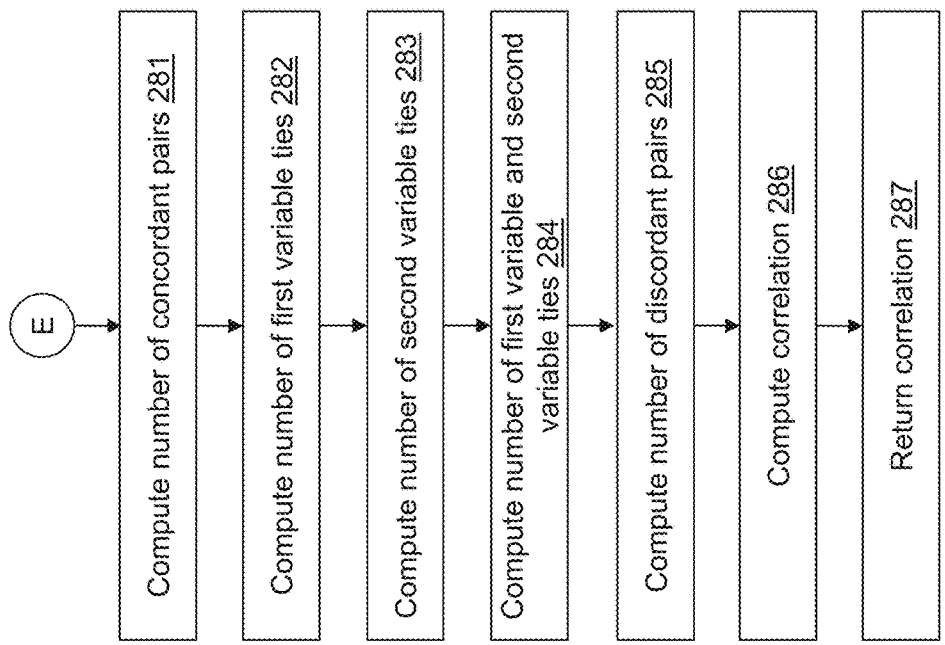

FIGS. 2E and 2F describe computation of a Kendall's tau correlation value. Referring to FIG. 2E, in operation 270, an N matrix is initialized to all zeros, where N is an m1 by m2 matrix.

In an operation 271, the row index i is initialized to two.

In an operation 272, the column index j is initialized to two.

In an operation 273, a determination is made concerning whether or not j=2. When j=2, processing continues in an operation 274. When j≠2, processing continues in an operation 275.

In operation 274, the N matrix is updated using $N[i,j]=M[i-1,j-1]$, and processing continues in an operation 276.

In operation 275, the N matrix is updated using $N[i,j]=N[i,j-1]+M[i-1,j-1]$, and processing continues in operation 276.

In operation 276, a determination is made concerning whether or not j>m2 indicating that all of the columns have been processed. When j>m2, processing continues in an operation 278. When j≤m2, processing continues in an operation 277.

In operation 277, j=j+1, and processing continues in operation 273.

In operation 278, a determination is made concerning whether or not i>m1 indicating that all of the rows have been processed. When i>m1, processing continues in an operation 280. When i≤m1, processing continues in an operation 279.

In operation 279, t=t+1, and processing continues in operation 272.

In operation 280, the N matrix is updated using $N[i,j]=N[i,j]+N[i-1,j]$ for j=1, . . . , m2, and processing continues in operation 281 shown referring to FIG. 2F. Operations 270-280 compute $N[i,j]=\Sigma_{l1=1}^{i-1}\Sigma_{l2=1}^{j-1}M[l1,l2]$ using dynamic programming techniques.

Referring to FIG. 2F, in an operation 281, a number of discordant pairs P is computed using $P=\Sigma_{i=1}^{m1}\Sigma_{j=1}^{m2} M[i,j]*N[i,j]$.

In an operation 282, a number of only first variable ties T is computed using $T=[\Sigma_{i=1}^{m1}((n_r[i])^2-\Sigma_{j=1}^{m2}(M[i,j])^2)]/2$.

In an operation 283, a number of only second variable ties U is computed using $U=[\Sigma_{j=1}^{m2}((n_c[j])^2-\Sigma_{i=1}^{m1}(M[i,j])^2)]/2$.

In an operation 284, a number of first variable and second variable ties B is computed using $B=\Sigma_{i=1}^{m1}\Sigma_{j=1}^{m2}M[i,j]*(M[i,j]-1)/2$.

In an operation 285, a number of discordant pairs Q is computed using $$Q = \left((n+1)*\frac{n}{2}\right) - P - T - U - B.$$

In an operation 286, a correlation value $c_K$ is computed using $c_K=(P-Q)/\sqrt{(P+Q+T)*(P+Q+U)}$.

In operation 287, the computed correlation value $c_K$ is returned and processing continues in operation 246 shown referring to FIG. 2B.

Figure 4:
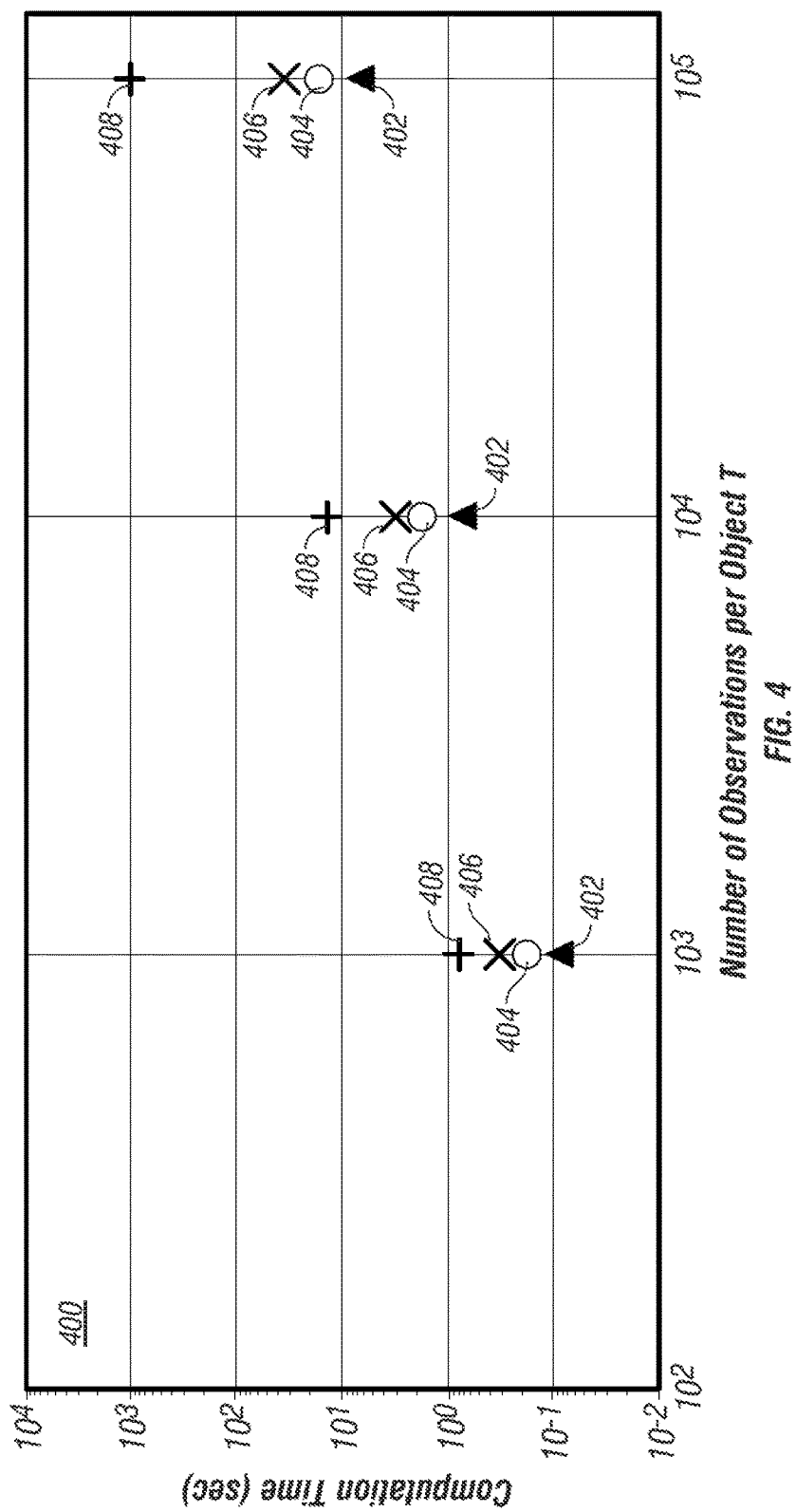
FIG. 4 shows a comparison in computation time of a Spearman's rank correlation in accordance with an illustrative embodiment.

Referring to FIG. 4, a first scatterplot 400 shows a comparison in computation time of a Spearman's rank correlation value as a function of the number of observations per object T with different numbers of first and second variable bins in accordance with an illustrative embodiment. The first variable data points $x_i$, i=1, . . . , T were generated from an independently and identically distributed (iid) normal distribution N(0,1). The second variable data points were generated using $y_i=(z_i+\sigma x_i)/\sqrt{\sigma+1}$, where $z_i$, i=1, . . . , T is an iid N(0,1) random variable that is independent to $x_i$. As a result, both $\{x_i\}_{i=1}^T$ and $\{y_i\}_{i=1}^T$ are iid N(0,1) random variables with a Pearson correlation coefficient of $\sigma/\sqrt{\sigma+1}$. All numerical values were averaged over 10 replications. First scatterplot 400 was generated using the number of observations per correlation computation $n_g=1$.

First computation time points 402 show a computation time as a function of the number of observations per object T with 20 first and second variable bins using the algorithm described by FIGS. 2A, 2B, 2C, and 2D. Second computation time points 404 show a computation time as a function of the number of observations per object T with 50 first and second variable bins using the algorithm described by FIGS. 2A, 2B, 2C, and 2D. Third computation time points 406 show a computation time as a function of the number of observations per object T with 100 first and second variable bins using the algorithm described by FIGS. 2A, 2B, 2C, and 2D. The location of each first and second variable bin boundary was computed as a successive equally space quantile of a normal distribution as described in operations 224 and 226. Fourth computation time points 408 show a computation time as a function of the number of observations per object T using an existing Spearman's rank correlation computation algorithm efficiently implemented using the C programming language. The algorithm described by FIGS. 2A, 2B, 2C, and 2D was implemented using the Python programming language. It is expected that implementing the algorithm described by FIGS. 2A, 2B, 2C, and 2D using the C programming language will result in another 10- to 100-fold decrease in computation time relative to the existing Spearman's rank correlation computation algorithm.

Increasing the number of first and second variable bins increased the computation time using FIGS. 2A, 2B, 2C, and 2D. Additionally, as the number of observations per object T increased, the difference between the computation time using FIGS. 2A, 2B, 2C, and 2D and the existing Spearman's rank correlation computation algorithm also increased dramatically. The computation time using FIGS. 2A, 2B, 2C, and 2D with 20 first and second variable bins took less than 10 seconds to compute with $T=10^5$, whereas the existing Spearman's rank correlation computation algorithm took more than 1,000 seconds, a 100-fold increase in computation time. With $T=10^6$ (not shown), the existing Spearman's rank correlation computation algorithm became too slow to handle such a case having a time complexity of $O(T^2 \log T)$, whereas, the computation time using FIGS. 2A, 2B, 2C, and 2D is proportional to T, and remains computationally feasible.

Figure 5:
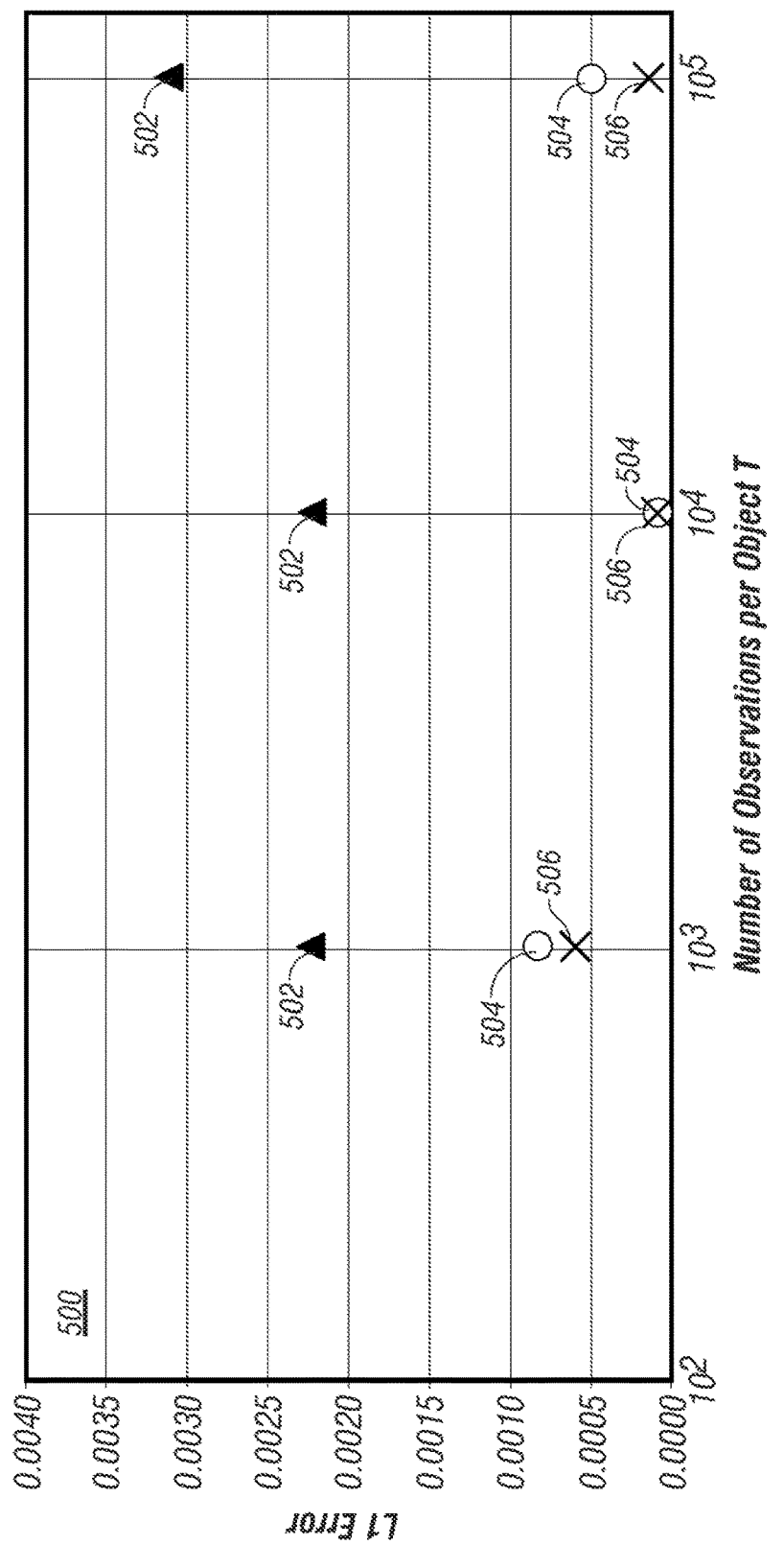
FIG. 5 shows an error comparison in computing the Spearman's rank correlation of FIG. 4 in accordance with an illustrative embodiment.

Referring to FIG. 5, a second scatterplot 500 shows a comparison in L1 error generated as a result of the computations shown in FIG. 4 in accordance with an illustrative embodiment. The results using FIGS. 2A, 2B, 2C, and 2D were compared to the known Pearson correlation coefficient value of $\sigma/\sqrt{\sigma^2+1}$. First L1 error points 502 show the L1 error as a function of the number of observations per object T with 20 first and second variable bins using the algorithm described by FIGS. 2A, 2B, 2C, and 2D. Second L1 error points 504 show the L1 error as a function of the number of observations per object T with 50 first and second variable bins using the algorithm described by FIGS. 2A, 2B, and 2D. Third L1 error points 506 show the L1 error as a function of the number of observations per object T with 100 first and second variable bins using the algorithm described by FIGS. 2A, 2B, 2C, and 2D. The L1 error does not increase with T and generally decreases with the number of first and second variable bins. For all cases, the L1 error was below 0.004.

Figure 6:
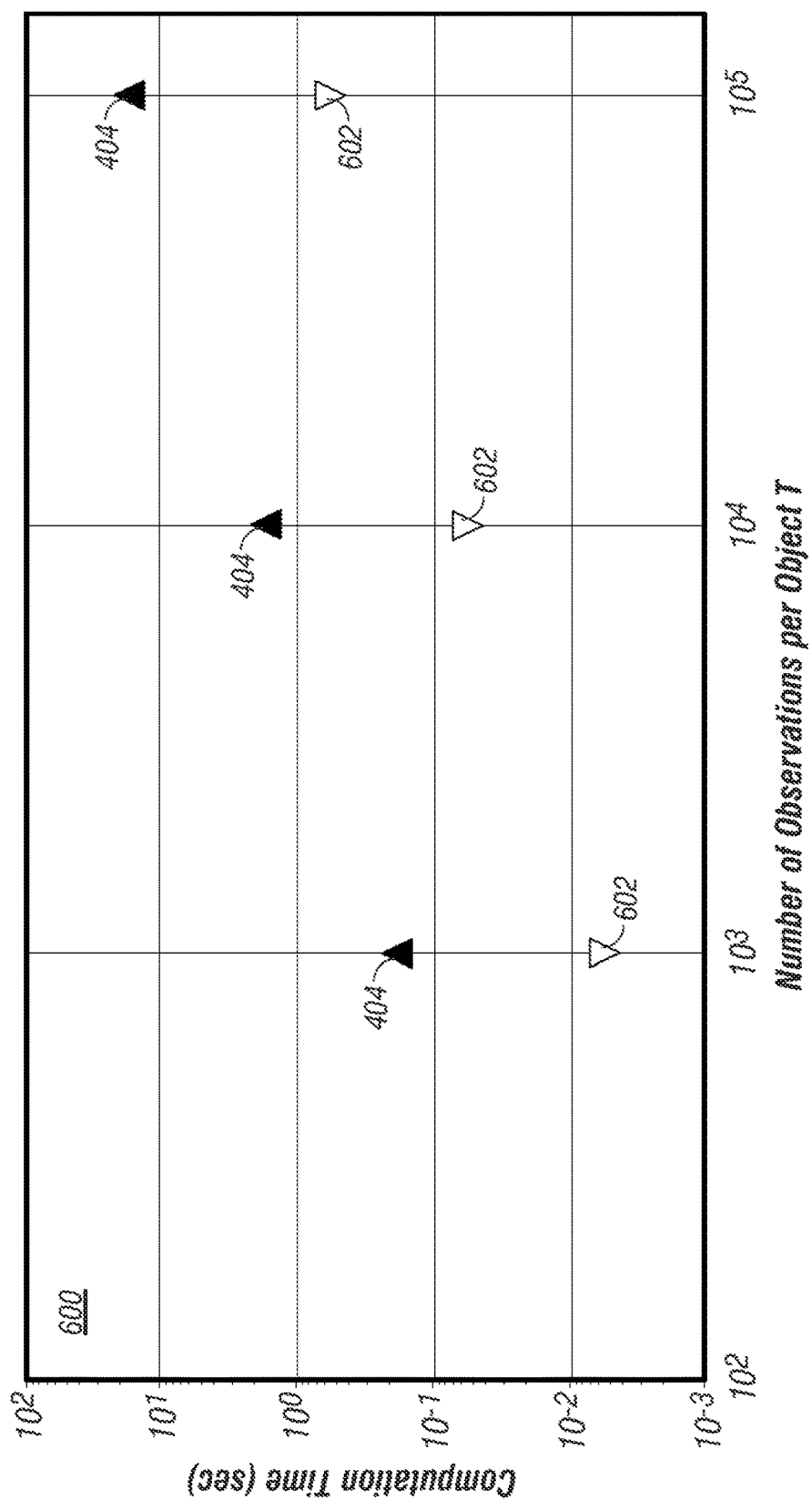
FIG. 6 shows a comparison in computation time of the Spearman's rank correlation with a different update frequency in accordance with an illustrative embodiment.

Referring to FIG. 6, a third scatterplot 600 shows a comparison in computation time for second computation time points 404 of FIG. 4 and using $n_g=100$ as shown by fifth computation time points 602 in accordance with an illustrative embodiment. The decrease in computation time using $n_g=100$ was 30-fold for all values of T.

Figure 7:
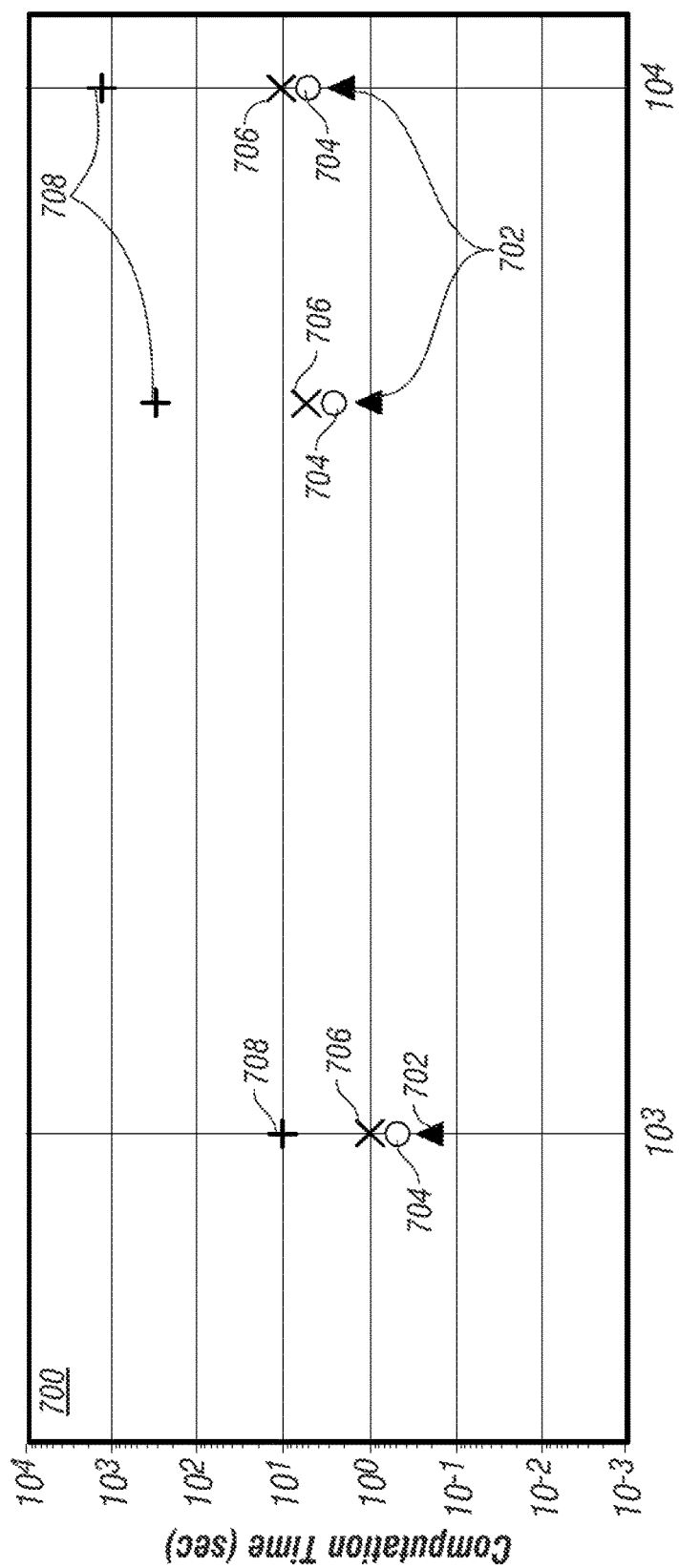
FIG. 7 shows a comparison in computation time of a Kendall's tau correlation in accordance with an illustrative embodiment.
Figure 8:
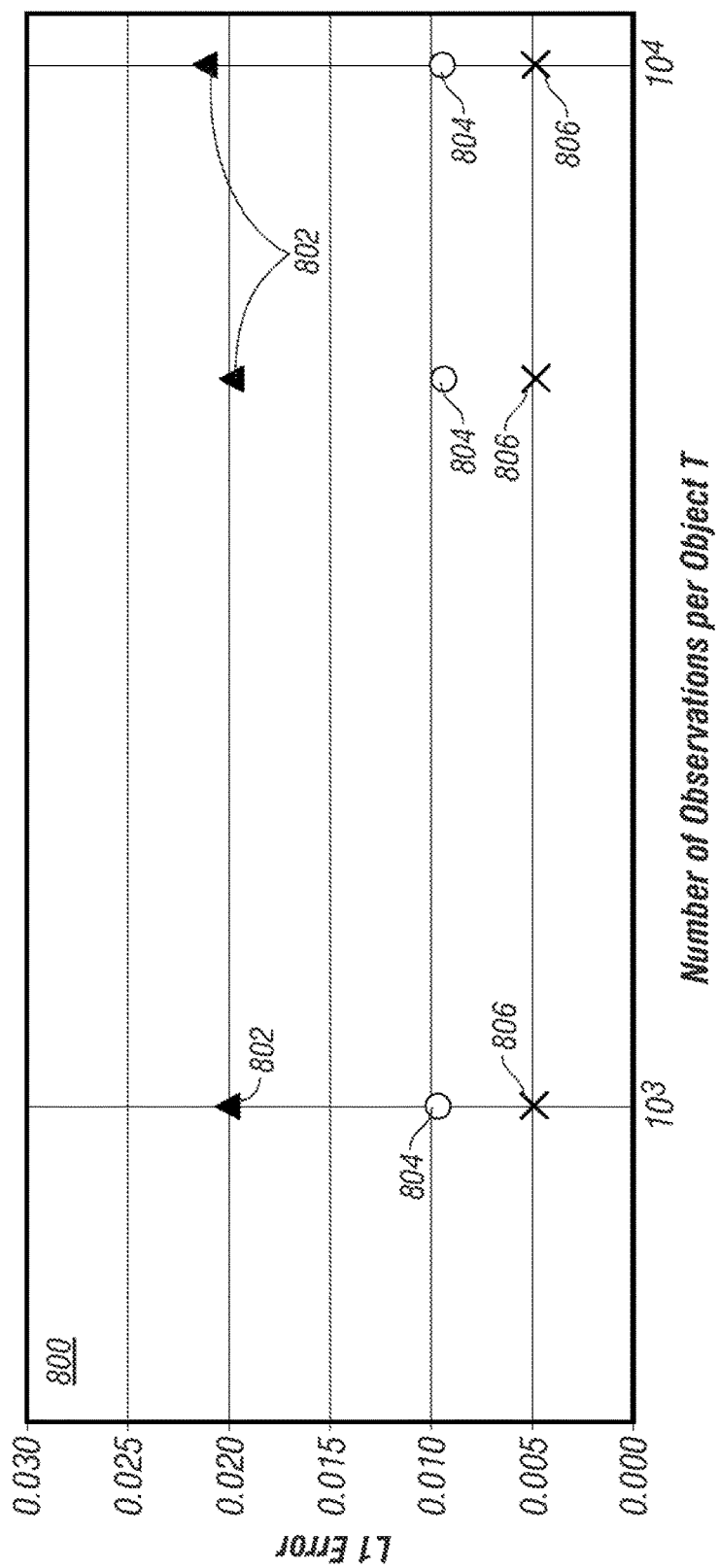
FIG. 8 shows an error comparison in computing the Kendall's tau correlation of FIG. 4 in accordance with an illustrative embodiment.
Figure 9:
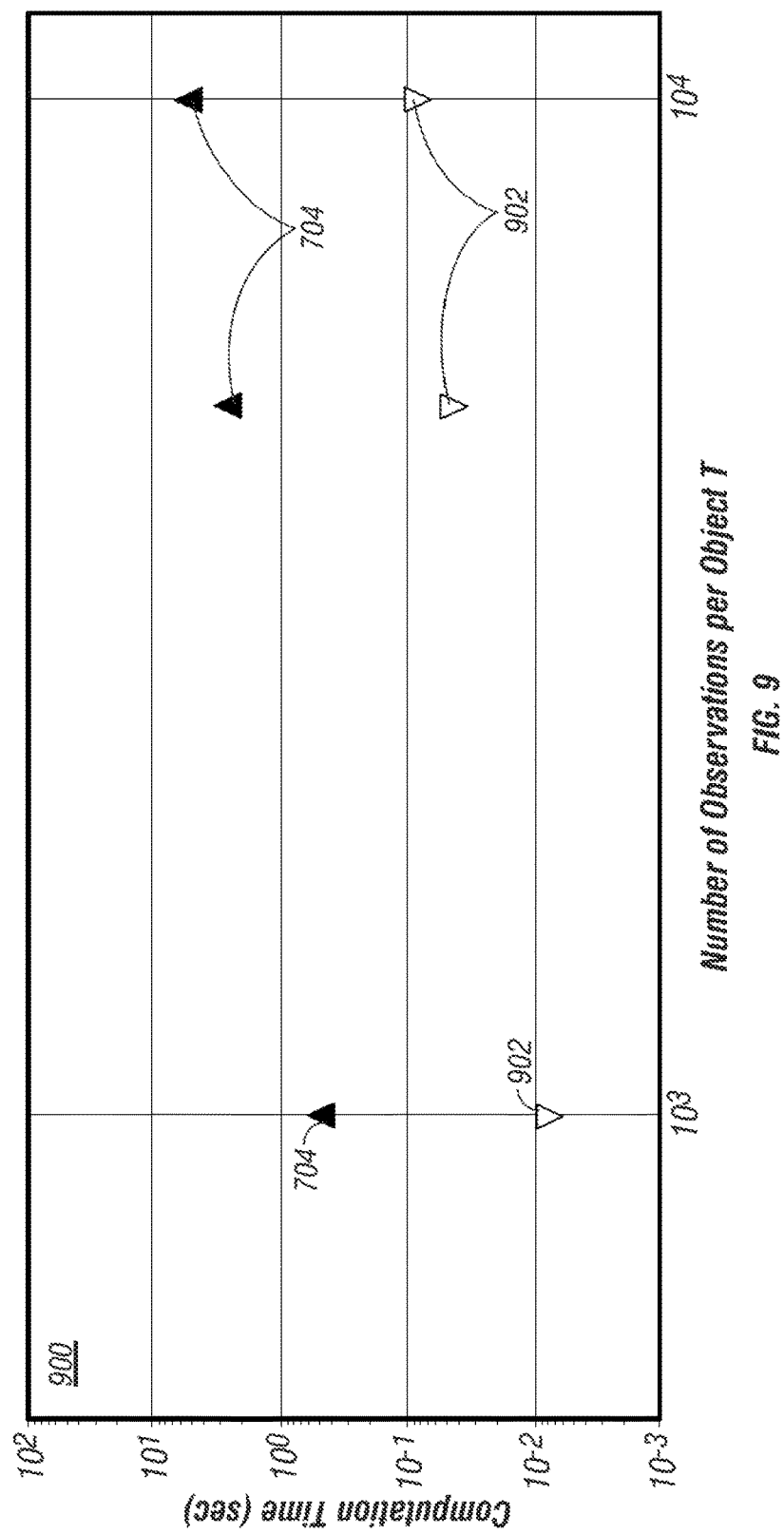
FIG. 9 shows a comparison in computation time of the Kendall's tau correlation with a different update frequency in accordance with an illustrative embodiment.

FIGS. 7 to 9 show the same comparisons as provided in FIGS. 4 to 6 except computing the Kendall's tau correlation using the algorithm described by FIGS. 2A, 2B, 2E, and 2F. The results are similar. Referring to FIG. 7, a fourth scatterplot 700 shows a comparison in computation time of the Kendall's tau correlation value as a function of the number of observations per object T with different numbers of first and second variable bins in accordance with an illustrative embodiment.

Sixth computation time points 702 show a computation time as a function of the number of observations per object T with 20 first and second variable bins using the algorithm described by FIGS. 2A, 2B, 2E, and 2F. Seventh computation time points 704 show a computation time as a function of the number of observations per object T with 50 first and second variable bins using the algorithm described by FIGS. 2A, 2B, 2E, and 2F. Eighth computation time points 706 show a computation time as a function of the number of observations per object T with 100 first and second variable bins using the algorithm described by FIGS. 2A, 2B, 2E, and 2F. Ninth computation time points 708 show a computation time as a function of the number of observations per object T using an existing Kendall's tau correlation computation algorithm efficiently implemented using the C programming language. The algorithm described by FIGS. 2A, 2B, 2E, and 2F was implemented using the Python programming language. It is expected that implementing the algorithm described by FIGS. 2A, 2B, 2E, and 2F using the C programming language would results in another 10- to 100-fold decrease in computation time relative to the existing Kendall's tau correlation computation algorithm.

Increasing the number of first and second variable bins increased the computation time using FIGS. 2A, 2B, 2E, and 2F. Additionally, as the number of observations per object T increased, the difference between the computation time using FIGS. 2A, 2B, 2E, and 2F and the existing Kendall's tau correlation computation algorithm also increased dramatically. The computation time using FIGS. 2A, 2B, 2E, and 2F with 20 first and second variable bins took less than 10 seconds to compute with $T=10^4$; whereas the existing Spearman's rank correlation computation algorithm took more than 1,000 seconds, a 100-fold increase in computation time. With $T=10^5$ (not shown), the existing Kendall's tau correlation computation algorithm became too slow to handle such a case having a time complexity of $O(T^2 \log T)$, whereas, the computation time using FIGS. 2A, 2B, 2E, and 2F is proportional to T.

Referring to FIG. 8, a fifth scatterplot 800 shows a comparison in L1 error generated as a result of the computations shown in FIG. 7 in accordance with an illustrative embodiment. The results using FIGS. 2A, 2B, 2E, and 2F were compared to the known Pearson correlation coefficient value of $\sigma/\sqrt{\sigma^2+1}$. Fourth L1 error points 802 show the L1 error as a function of the number of observations per object T with 20 first and second variable bins using the algorithm described by FIGS. 2A, 2B, 2E, and 2F. Fifth L1 error points 804 show the L1 error as a function of the number of observations per object T with 50 first and second variable bins using the algorithm described by FIGS. 2A, 2B, 2C, and 2D. Sixth L1 error points 806 show the L1 error as a function of the number of observations per object T with 100 first and second variable bins using the algorithm described by FIGS. 2A, 2B, 2E, and 2F. The L1 error does not increase with T and generally decreases with the number of first and second variable bins. For all cases, the L1 error was below 0.01.

Referring to FIG. 9, a tenth scatterplot 900 shows a comparison in computation time for seventh computation time points 704 of FIG. 7 and using $n_g=100$ as shown by tenth computation time points 902 in accordance with an illustrative embodiment. The decrease in computation time using $n_g=100$ was 60-fold to 70-fold for all values of T.

Figure 10:
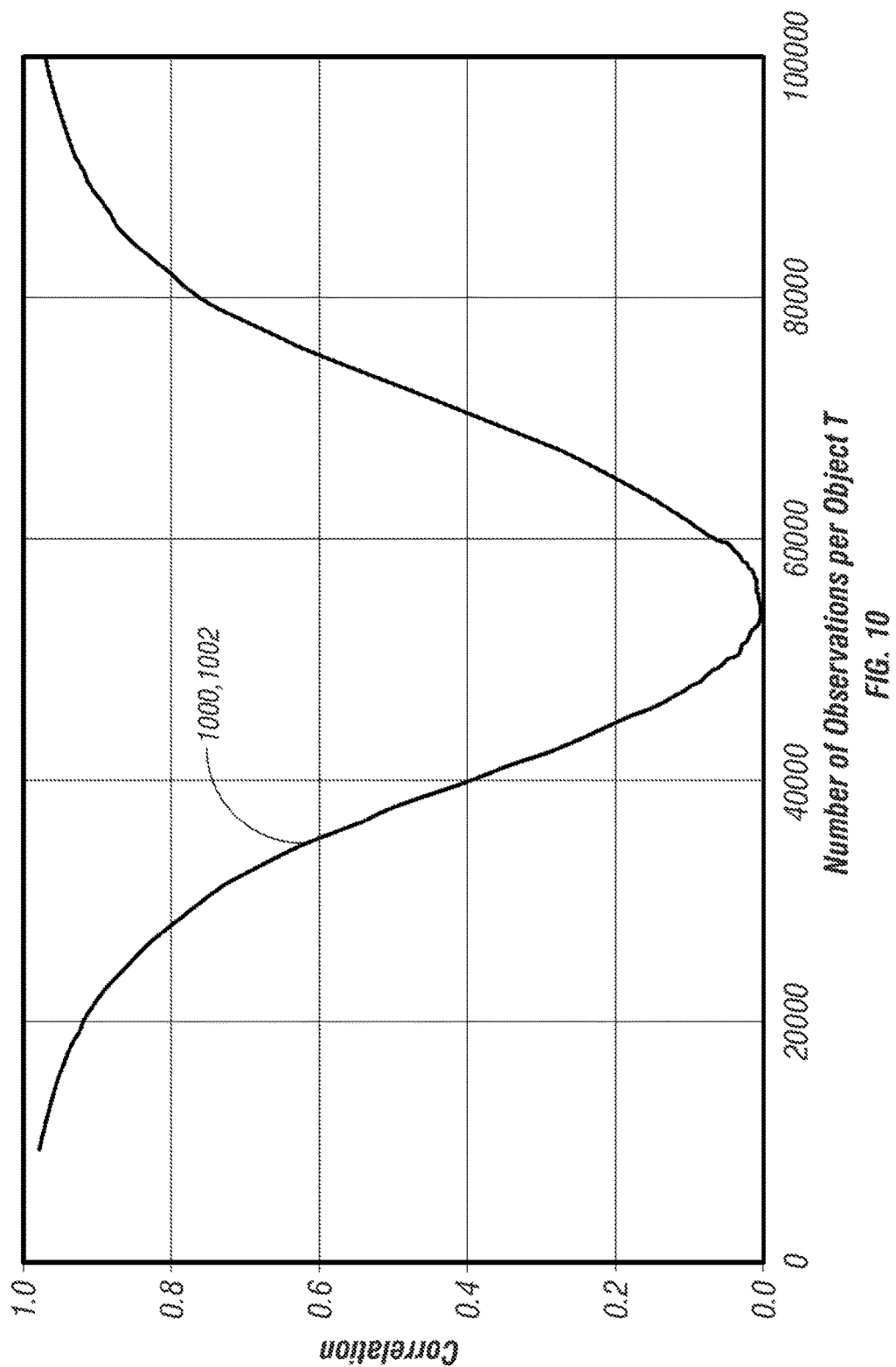
FIG. 10 shows an accuracy comparison in computing the Spearman's rank correlation in accordance with an illustrative embodiment.

Referring to FIG. 10, a first Spearman's rank correlation curve 1000 and a second Spearman's rank correlation curve 1002 are shown in accordance with an illustrative embodiment. First Spearman's rank correlation curve 1000 and second Spearman's rank correlation curve 1002 show an absolute value of the Spearman's rank correlation computed as a function of the number of observations per object T. The first variable data points $x_i$, i=1, ..., T were generated from an iid normal distribution N(0,1). The second variable data points were generated using $y_i=(z_i+\sigma(i)x_i/\sqrt{\sigma(i)^2+1}$, where $z_i$, i=1, ..., T is an iid N(0,1) random variable that was independent of $x_i$, and $\sigma(i)=5[(i-50000)/50000]^2$. First Spearman's rank correlation curve 1000 shows the correlation computed using the existing Spearman's rank correlation computation algorithm. Second Spearman's rank correlation curve 1002 shows the correlation computed using the algorithm described by FIGS. 2A, 2B, 2C, and 2D with m1=m2=30, $n_g=1$, and $n_w=10000$.

The algorithm described by FIGS. 2A, 2B, 2C, and 2D generated a very accurate estimate of the Spearman's rank correlation because first Spearman's rank correlation curve 1000 and second Spearman's rank correlation curve 1002 are indistinguishable for all values of T. The computation time using the existing Spearman's rank correlation computation algorithm was 216.66 seconds. The computation time using the algorithm described by FIGS. 2A, 2B, 2C, and 2D was 9.84 seconds.

Figure 11:
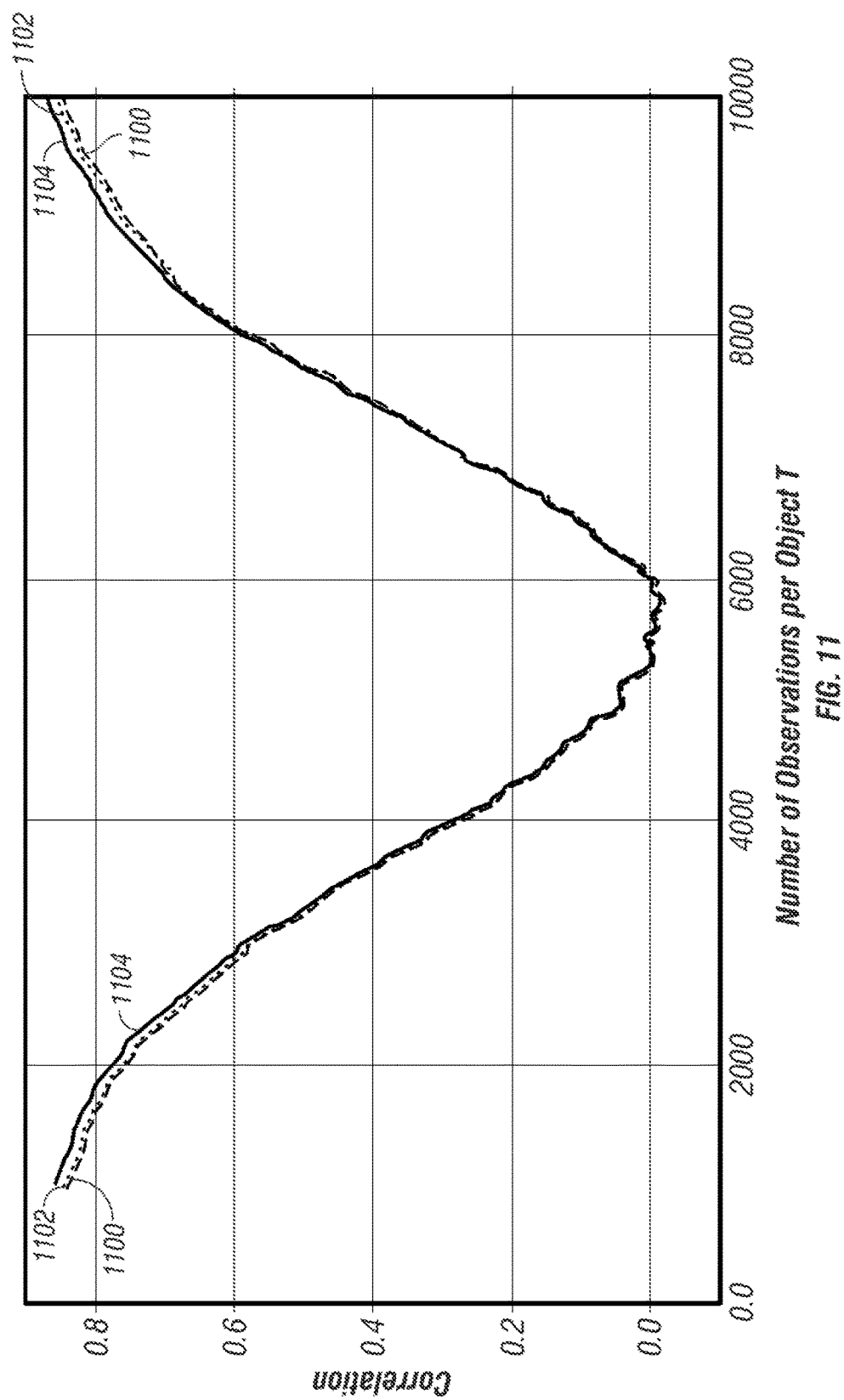
FIG. 11 shows an accuracy comparison in computing the Kendall's tau correlation in accordance with an illustrative embodiment.

Referring to FIG. 11, a first Kendall's tau correlation curve 1100, a second Kendall's tau correlation curve 1102, and a third Kendall's tau correlation curve 1104 are shown in accordance with an illustrative embodiment. First Kendall's tau correlation curve 1100, second Kendall's tau correlation curve 1102, and third Kendall's tau correlation curve 1104 show an absolute value of the Kendall's tau correlation computed as a function of the number of observations per object T. The first variable data points $x_i$, i=1, ..., T were generated from an iid normal distribution N(0,1). The second variable data points were generated using $y_i=(z_i+\sigma(i)x_i/\sqrt{\sigma(i)^2+1}$, where $z_i$, i=1, ..., T is an iid N(0,1) random variable that was independent of $x_i$, and $\sigma(i)=5[(i-5000)/5000]^2$.

First Kendall's tau correlation curve 1100 shows the correlation computed using the existing Kendall's tau correlation computation algorithm. Second Kendall's tau correlation curve 1102 shows the correlation computed using the algorithm described by FIGS. 2A, 2B, 2E, and 2F with m1=m2=100, $n_g=1$, and $n_w=1000$. Third Kendall's tau correlation curve 1104 shows the correlation computed using the algorithm described by FIGS. 2A, 2B, 2E, and 2F with m1=m2=30, $n_g=1$, and $n_w=1000$. The algorithm described by FIGS. 2A, 2B, 2E, and 2F generated a very accurate estimate of the Kendall's tau correlation when the absolute value of the correlation was relatively small (<~0.5), but a more biased estimate when the absolute value of the correlation was larger because, when x, y are highly correlated, the $(x_i,y_i)$ pairs are likely to be concentrated on the diagonal of the bin matrix M resulting in a poor approximation of the bivariate distribution of (x, y) by the bin matrix M leading to the biased estimate. Second Kendall's tau correlation curve 1102 shows that using m1=m2≥100 achieves a more accurate result.

The computation time for first Kendall's tau correlation curve 1100 was 211.97 seconds. The computation time for second Kendall's tau correlation curve 1102 was 11.3 seconds. The computation time for third Kendall's tau correlation curve 1104 was 3.42 seconds.

Nonparametric correlations were computed from sensor data generated in an industrial plant from the 2015 Prognostics and Health Management Society Competition (J. Rosca, Z. Song, N. Willard, and N. Eklund, *PHM15 Challenge Competition and Data Set: Fault Prognostics*, NASA Ames Prognostics Data Repository, NASA Ames Research Center, Moffett Field, C A, 2015.). The data contained sensor readings from 50 industrial plants. For each plant, sensor readings from four standard sensors S1-S4 and from four control sensors R1-R4 were included. Nonparametric correlations were computed using $n_w=35040$, which corresponded to a one-year time window.

Figure 12:
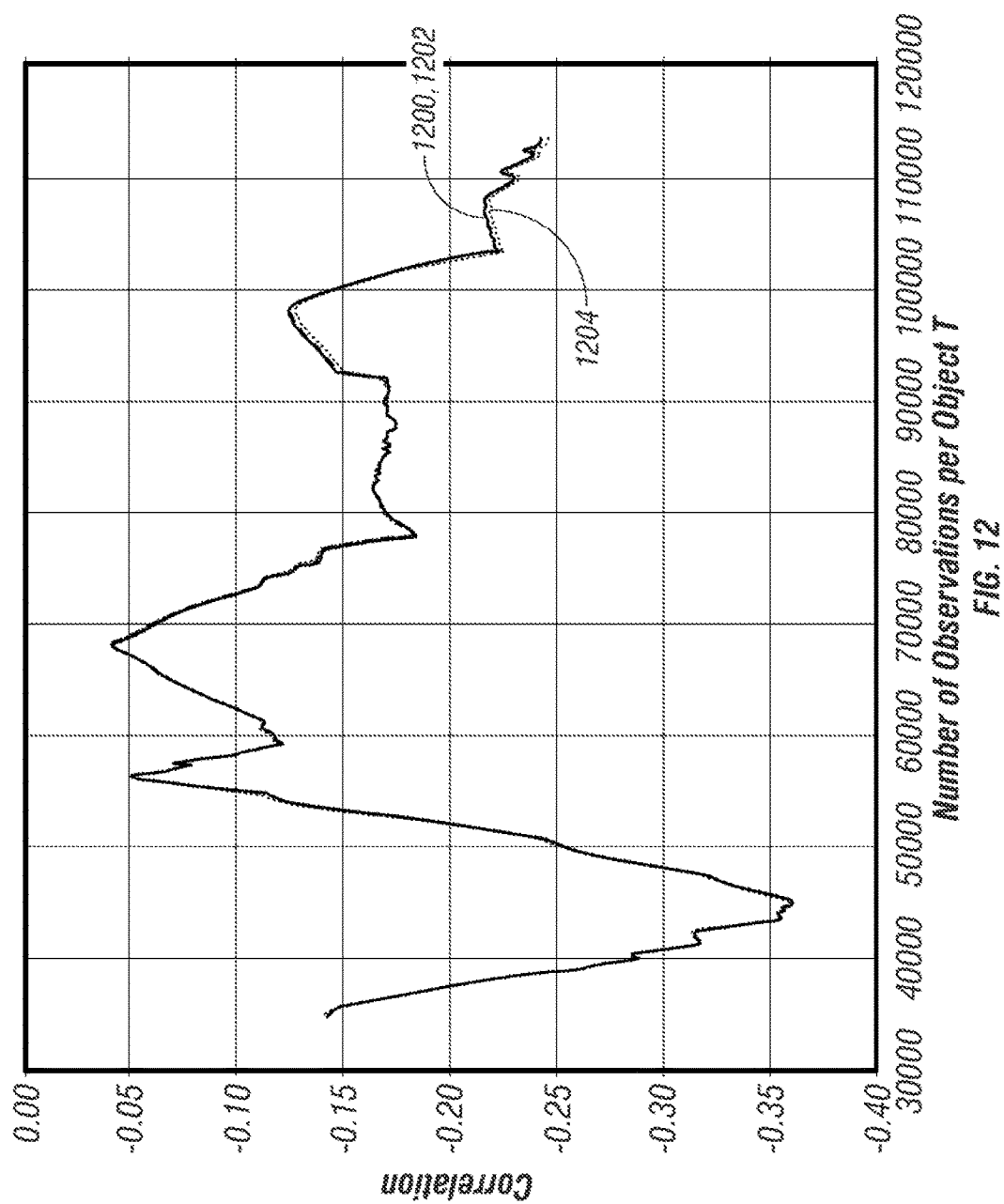
FIG. 12 shows an accuracy comparison in computing the Spearman's rank correlation in accordance with an illustrative embodiment.

Referring to FIG. 12, a fourth Spearman's rank correlation curve 1200, a fifth Spearman's rank correlation curve 1202, and a sixth Spearman's rank correlation curve 1204 are shown in accordance with an illustrative embodiment. Fourth Spearman's rank correlation curve 1200, fifth Spearman's rank correlation curve 1202, and sixth Spearman's rank correlation curve 1204 show a value of the Spearman's rank correlation computed as a function of the number of observations per object T between R1 and S1 recorded from the first plant. R1 had 10 unique values and S1 had 121 unique values. Fourth Spearman's rank correlation curve 1200 shows the correlation computed using the existing Spearman's rank correlation computation algorithm. Fifth Spearman's rank correlation curve 1202 shows the correlation computed using the algorithm described by FIGS. 2A, 2B, 2C, and 2D with m1=10 for first variable R1 and m2=121 for second variable S1, and $tn_g=1$.

The preceding description of operations of correlation update application 122 assumes that both X and Y are continuous. When X and Y are discrete or ordinal, the number of first variable bins or of second variable bins can be selected so that each pair of consecutive first and second variable bins contain a single level of X or Y, respectively. When both X and Y are discrete or ordinal variables, no information is lost by using bin matrix M to approximate the bivariate distribution of (X, Y), and correlation update application 122 computes the exact nonparametric correlation between X and Y. As a result, fourth Spearman's rank correlation curve 1200 directly overlaps fifth Spearman's rank correlation curve 1202. However, the computation time using the existing Spearman's rank correlation computation algorithm was 346.3 seconds. The computation time for computing fifth Spearman's rank correlation curve 1202 using the algorithm described by FIGS. 2A, 2B, 2C, and 2D was 17.73 seconds though generating the exact solution as that shown by fourth Spearman's rank correlation curve 1200. Thus, a 20-fold computation speed increase was provided using the algorithm described by FIGS. 2A, 2B, 2C, and 2D. Memory usage is also much, much less because the bin matrix M(10,121) is much smaller than storing all of the paired data points for R1 and S1.

Sixth Spearman's rank correlation curve 1204 shows the correlation computed using the algorithm described by FIGS. 2A, 2B, 2C, and 2D with m1=10 for first variable R1 and m2'=20 for second variable S1, and $n_g$=1. Sixth Spearman's rank correlation curve 1204 was computed using second variable internal bin boundaries chosen by computing quantiles of S1 at probabilities 0.05, 0.10, . . . , 0.95, and keeping only the unique values, which resulted in m2=20. Based on the selected m2, sixth Spearman's rank correlation curve 1204 provides an approximation of the correlation value. However, the approximation is very accurate, and the computation time for computing sixth Spearman's rank correlation curve 1204 using the algorithm described by FIGS. 2A, 2B, 2C, and 2D was 8.38 seconds. Thus, a 40-fold computation speed increase was provided using the algorithm described by FIGS. 2A, 2B, 2C, and 2D to achieve an accurate approximate solution.

Figure 13:
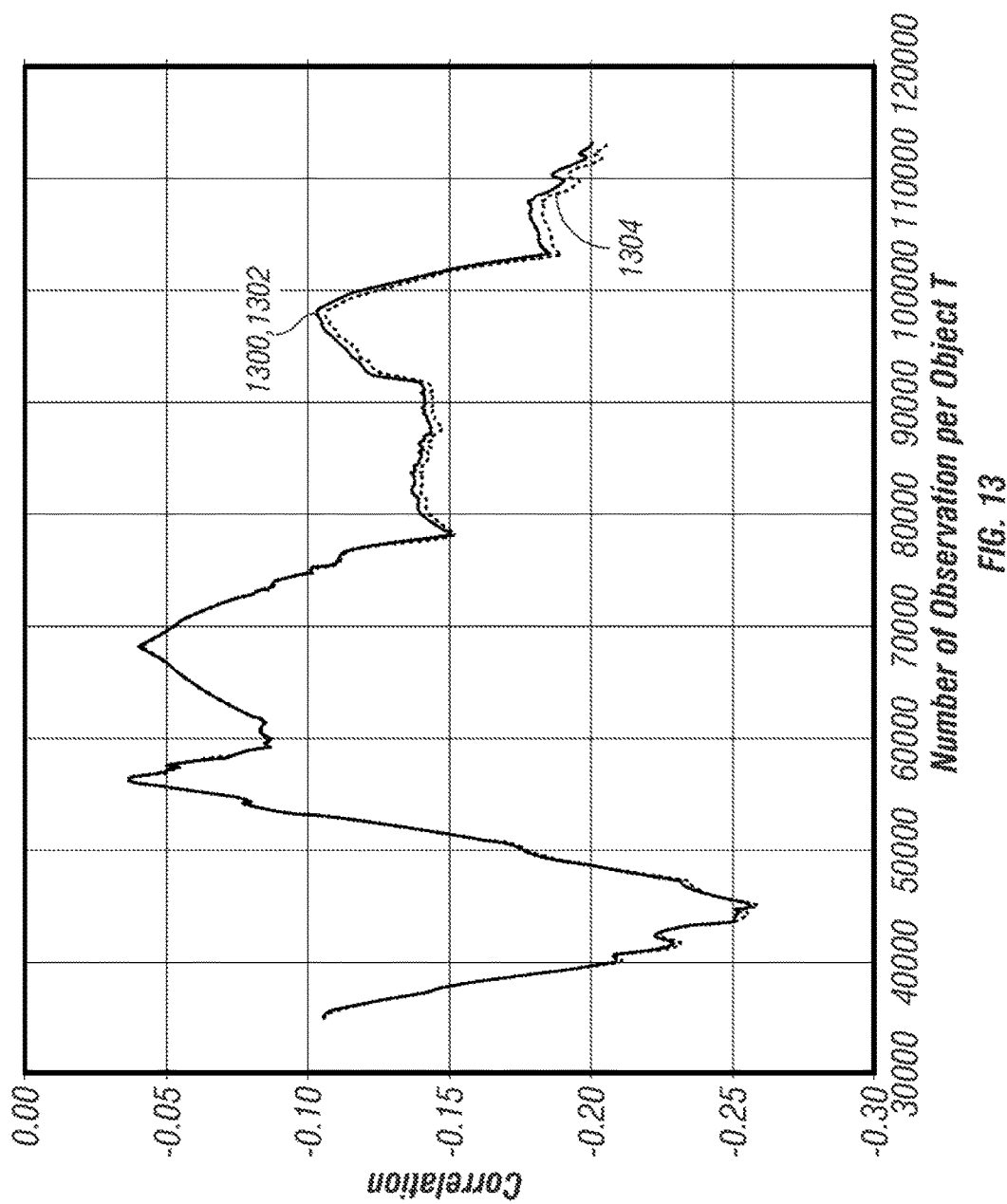
FIG. 13 shows an accuracy comparison in computing the Kendall's tau correlation in accordance with an illustrative embodiment.

Referring to FIG. 13, a fourth Kendall's tau correlation curve 1300, a fifth Kendall's tau correlation curve 1302, and a sixth Kendall's tau correlation curve 1304 are shown in accordance with an illustrative embodiment. Fourth Kendall's tau correlation curve 1300, fifth Kendall's tau correlation curve 1302, and sixth Kendall's tau correlation curve 1304 show a value of the Kendall's tau correlation computed as a function of the number of observations per object T between R1 and S1 recorded from the first plant. Fourth Kendall's tau correlation curve 1300 shows the correlation computed using the existing Kendall's tau correlation computation algorithm. Fifth Kendall's tau correlation curve 1302 shows the correlation computed using the algorithm described by FIGS. 2A, 2B, 2E, and 2F with m1=10 for first variable R1 and m2=121 for second variable S1, and $n_g$=1.

Fourth Kendall's tau correlation curve 1300 directly overlaps fifth Kendall's tau correlation curve 1302. However, the computation time using the existing Kendall's tau correlation computation algorithm was 314.25 seconds. The computation time for computing fifth Kendall's tau correlation curve 1302 using the algorithm described by FIGS. 2A, 2B, 2E, and 2F was 55.11 seconds though generating the exact solution as that shown by fourth Kendall's tau correlation curve 1300. Thus, a 5-fold computation speed increase was provided using the algorithm described by FIGS. 2A, 2B, 2E, and 2F. Again, the memory usage is also much, much less.

Sixth Kendall's tau correlation curve 1304 shows the correlation computed using the algorithm described by FIGS. 2A, 2B, 2E, and 2F with m1=10 for first variable R1 and m2'=20 for second variable S1, and $n_g$=1. Sixth Kendall's tau correlation curve 1304 was computed using second variable internal bin boundaries chosen by computing quantiles of S1 at probabilities 0.05, 0.10, . . . , 0.95, and keeping only the unique values, which resulted in m2=20. Based on the selected value for m2, sixth Kendall's tau correlation curve 1304 provides an approximation of the correlation value. However, the approximation is very accurate, and the computation time for computing sixth Kendall's tau correlation curve 1304 using the algorithm described by FIGS. 2A, 2B, 2E, and 2F was 17.06 seconds. Thus, a 20-fold computation speed increase was provided using the algorithm described by FIGS. 2A, 2B, 2E, and 2F to achieve an accurate approximate solution.

Nonparametric correlations were also computed as a function of the number of observations per object T between R3 and S3 recorded from the first plant. R3 had 8 unique values and S3 had 12 unique values.

Figure 14:
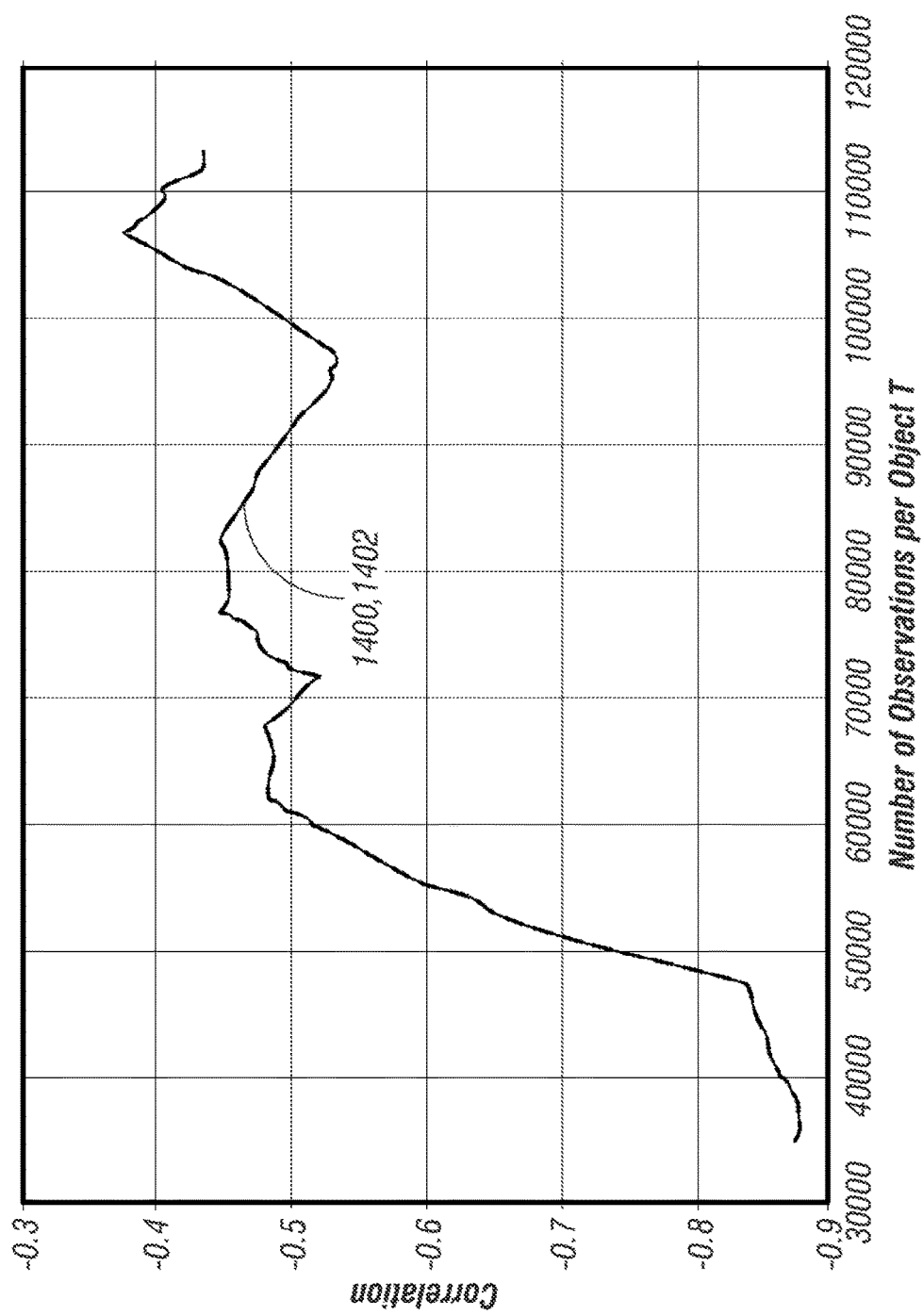
FIG. 14 shows an accuracy comparison in computing the Spearman's rank correlation in accordance with an illustrative embodiment.

Referring to FIG. 14, a seventh Spearman's rank correlation curve 1400 and an eighth Spearman's rank correlation curve 1402 are shown in accordance with an illustrative embodiment. Seventh Spearman's rank correlation curve 1400 and eighth Spearman's rank correlation curve 1402 show a value of the Spearman's rank correlation computed as a function of the number of observations per object T between R3 and S3 recorded from the first plant. Seventh Spearman's rank correlation curve 1400 shows the correlation computed using the existing Spearman's rank correlation computation algorithm. Eighth Spearman's rank correlation curve 1402 shows the correlation computed using the algorithm described by FIGS. 2A, 2B, 2C, and 2D with m1=8 for first variable R3 and m2=12 for second variable S3, and $n_g$=1.

As expected, seventh Spearman's rank correlation curve 1400 directly overlaps eighth Spearman's rank correlation curve 1402. However, the computation time using the existing Spearman's rank correlation computation algorithm was 304.34 seconds. The computation time for computing eighth Spearman's rank correlation curve 1402 using the algorithm described by FIGS. 2A, 2B, 2C, and 2D was 7.42 seconds though generating the exact solution as that shown by seventh Spearman's rank correlation curve 1400. Thus, a 40-fold computation speed increase was provided using the algorithm described by FIGS. 2A, 2B, 2C, and 2D. Memory usage is again much, much less.

Figure 15:
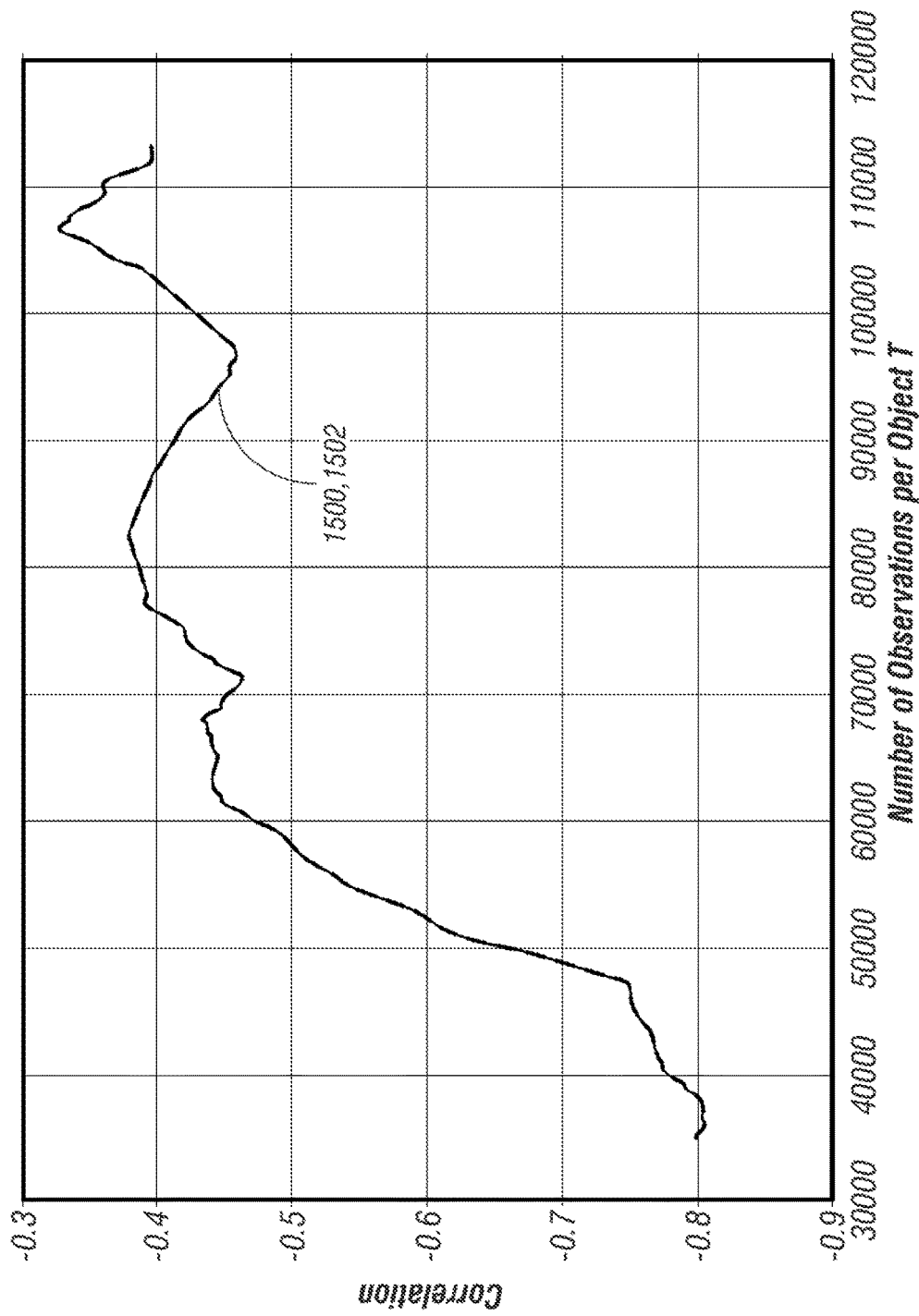
FIG. 15 shows an accuracy comparison in computing the Kendall's tau correlation in accordance with an illustrative embodiment.

Referring to FIG. 15, a seventh Kendall's tau correlation curve 1500 and an eighth Kendall's tau correlation curve 1502 are shown in accordance with an illustrative embodiment. Seventh Kendall's tau correlation curve 1500 and eighth Kendall's tau correlation curve 1502 show a value of the Kendall's tau correlation computed as a function of the number of observations per object T between R3 and S3 recorded from the first plant. Seventh Kendall's tau correlation curve 1500 shows the correlation computed using the existing Kendall's tau correlation computation algorithm. Eighth Kendall's tau correlation curve 1502 shows the correlation computed using the algorithm described by FIGS. 2A, 2B, 2E, and 2F with m1=8 for first variable R3 and m2=12 for second variable S3, and $n_g$=1.

As expected, seventh Kendall's tau correlation curve 1500 directly overlaps eighth Kendall's tau correlation curve 1502. However, the computation time using the existing Kendall's tau correlation computation algorithm was 244.74 seconds. The computation time for computing eighth Kendall's tau correlation curve 1502 using the algorithm described by FIGS. 2A, 2B, 2E, and 2F was 12.94 seconds though generating the exact solution as that shown by seventh Kendall's tau correlation curve 1400. Thus, a 20-fold computation speed increase was provided using the algorithm described by FIGS. 2A, 2B, 2E, and 2F. Memory usage is again much, much less.

Using the bin matrix M has two advantages. First, instead of the entire ($x_i$, $y_i$) series (which maybe unbounded in length) being stored, the information is stored in a matrix of M that has a fixed size. Second, when ($x_i$, $y_i$) are discretized and stored in the bin matrix M, they are naturally sorted and the described operations of FIGS. 2C and 2D and/or of FIGS. 2E and 2F quickly compute the Spearman's rank' correlation or the Kendall's' tau correlation, respectively, from the bin matrix M. The time complexity for both the Spearman's rank correlation and the Kendall's tau correlation is O(m1m2). Because both m1 and m2 are fixed integers, the algorithms both have time complexity O(1) and memory cost O(1), making correlation update application 122 suitable for implementation in edge devices, where limited memory and processing power may be available.

By changing the number of first and second variable bins, a user can select a balance between computation speed improvement and accuracy. Correlation update application 122 is very fast and can easily compute the correlations 10 to 1,000 times faster than the corresponding existing algorithms and can compute nonparametric correlations based either on all past observations or using fixed-size sliding windows based on a user selection of a value for the sliding window size $n_w$.

Figure 16:
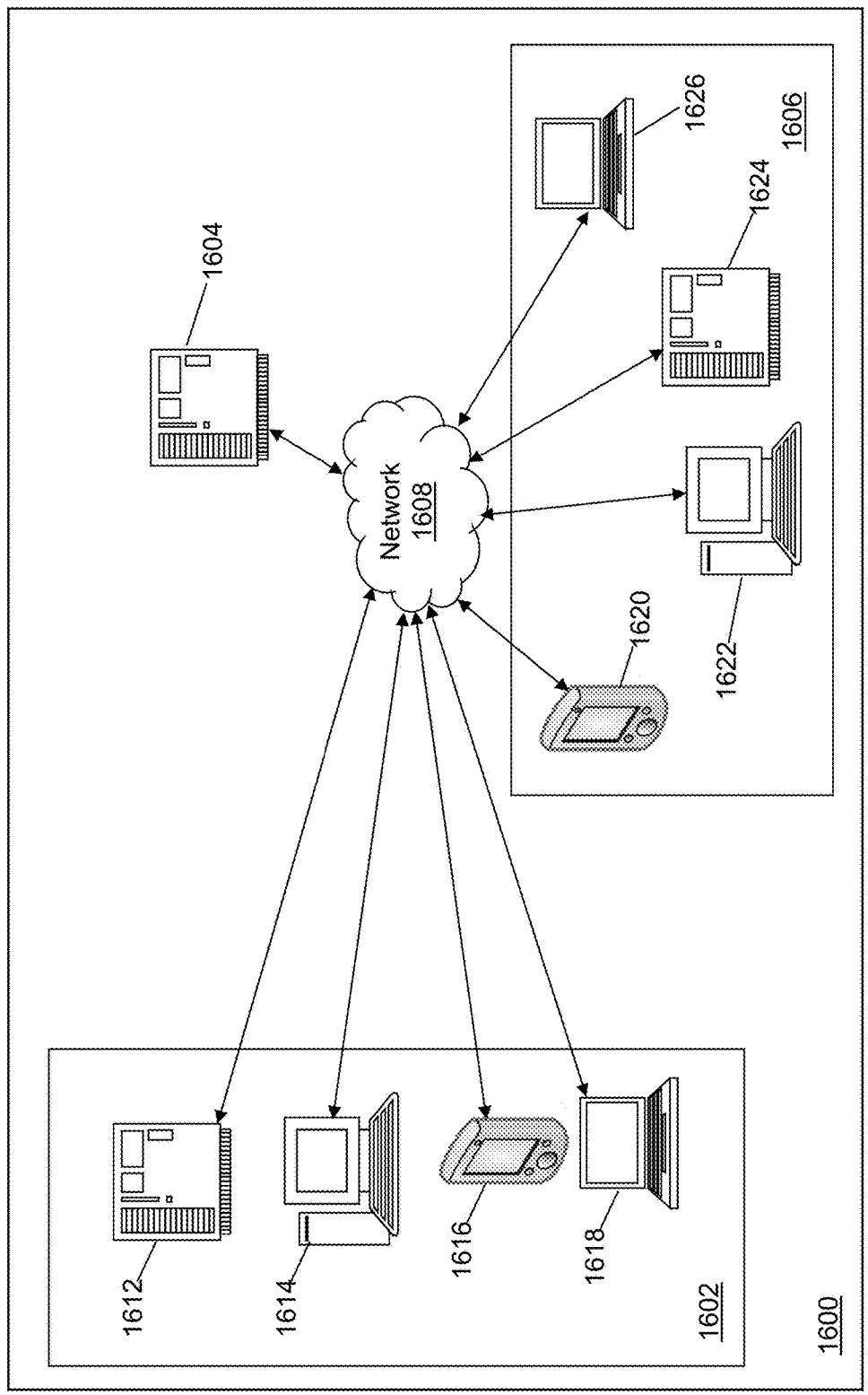
FIG. 16 depicts a block diagram of a stream processing system in accordance with an illustrative embodiment.

Referring to FIG. 16, a block diagram of a stream processing system 1600 is shown in accordance with an illustrative embodiment. In an illustrative embodiment, stream processing system 1600 may include an event publishing system 1602, an ESP device 1604, an event subscribing system 1606, and a network 1608. Each of event publishing system 1602, ESP device 1604, and event subscribing system 1606 may be composed of one or more discrete devices in communication through network 1608.

Event publishing system 1602 includes, is integrated with, and/or communicates with one or more sensors 2013 (shown referring to FIG. 20), data generation devices, data capture devices, etc. For example, sensor 2013 may produce a sensor signal value referred to as a measurement data value representative of a measure of a physical quantity in an environment to which sensor 2013 is associated and generate a corresponding measurement datum that typically is associated with a time that the measurement datum is generated. The environment to which sensor 2013 is associated for monitoring may include a power grid system, a telecommunications system, a fluid (oil, gas, water, etc.) pipeline, a transportation system, an industrial device, a medical device, an appliance, a vehicle, a computing device, etc. Example sensor types include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

Event publishing system 1602 publishes the measurement data value to ESP device 1604 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. ESP device 1604 receives the measurement data value in an event stream, processes the measurement data value, and identifies a computing device of event subscribing system 1606 to which a computed correlation value is sent.

Network 1608 may include one or more networks of the same or different types. Network 1608 can be any type of wired and/or wireless public or private network including a cellular network, a local area network, a wide area network such as the Internet or the World Wide Web, etc. Network 1608 further may comprise sub-networks and consist of any number of communication devices.

The one or more computing devices of event publishing system 1602 may include computing devices of any form factor such as a server computer 1612, a desktop 1614, a smart phone 1616, a laptop 1618, a personal digital assistant, an integrated messaging device, a tablet computer, a point of sale system, a transaction system, etc. Event publishing system 1602 can include any number and any combination of form factors of computing devices that may be organized into subnets. The computing devices of event publishing system 1602 send and receive signals through network 1608 to/from another of the one or more computing devices of event publishing system 1602 and/or to/from ESP device 1604. The one or more computing devices of event publishing system 1602 may communicate using various transmission media that may be wired and/or wireless as understood by those skilled in the art. The one or more computing devices of event publishing system 1602 may be geographically dispersed from each other and/or co-located. Each computing device of the one or more computing devices of event publishing system 1602 may be executing one or more event publishing applications such as an event publishing application 2022 (shown referring to FIG. 20) of the same or different type.

ESP device 1604 can include any form factor of computing device. For illustration, FIG. 16 represents ESP device 1604 as a server computer. In general, a server computer may include faster processors, additional processors, more disk memory, and/or more random-access memory (RAM) than a client computer and support multi-threading as understood by a person of skill in the art. ESP device 1604 sends and receives signals through network 1608 to/from event publishing system 1602 and/or to/from event subscribing system 1606. ESP device 1604 may communicate using various transmission media that may be wired and/or wireless as understood by those skilled in the art. ESP device 1604 may be implemented on a plurality of computing devices of the same or different type that support failover processing.

The one or more computing devices of event subscribing system 1606 may include computers of any form factor such as a smart phone 1620, a desktop 1622, a server computer 1624, a laptop 1626, a personal digital assistant, an integrated messaging device, a tablet computer, etc. Event subscribing system 1606 can include any number and any combination of form factors of computing devices. The computing devices of event subscribing system 1606 send and receive signals through network 1608 to/from ESP device 1604. The one or more computing devices of event subscribing system 1606 may be geographically dispersed from each other and/or co-located. The one or more computing devices of event subscribing system 1606 may communicate using various transmission media that may be wired and/or wireless as understood by those skilled in the art. Each computing device of the one or more computing devices of event subscribing system 1606 may be executing one or more event subscribing applications such as an event subscribing application 2222 (shown referring to FIG. 22) of the same or different type.

Figure 17:
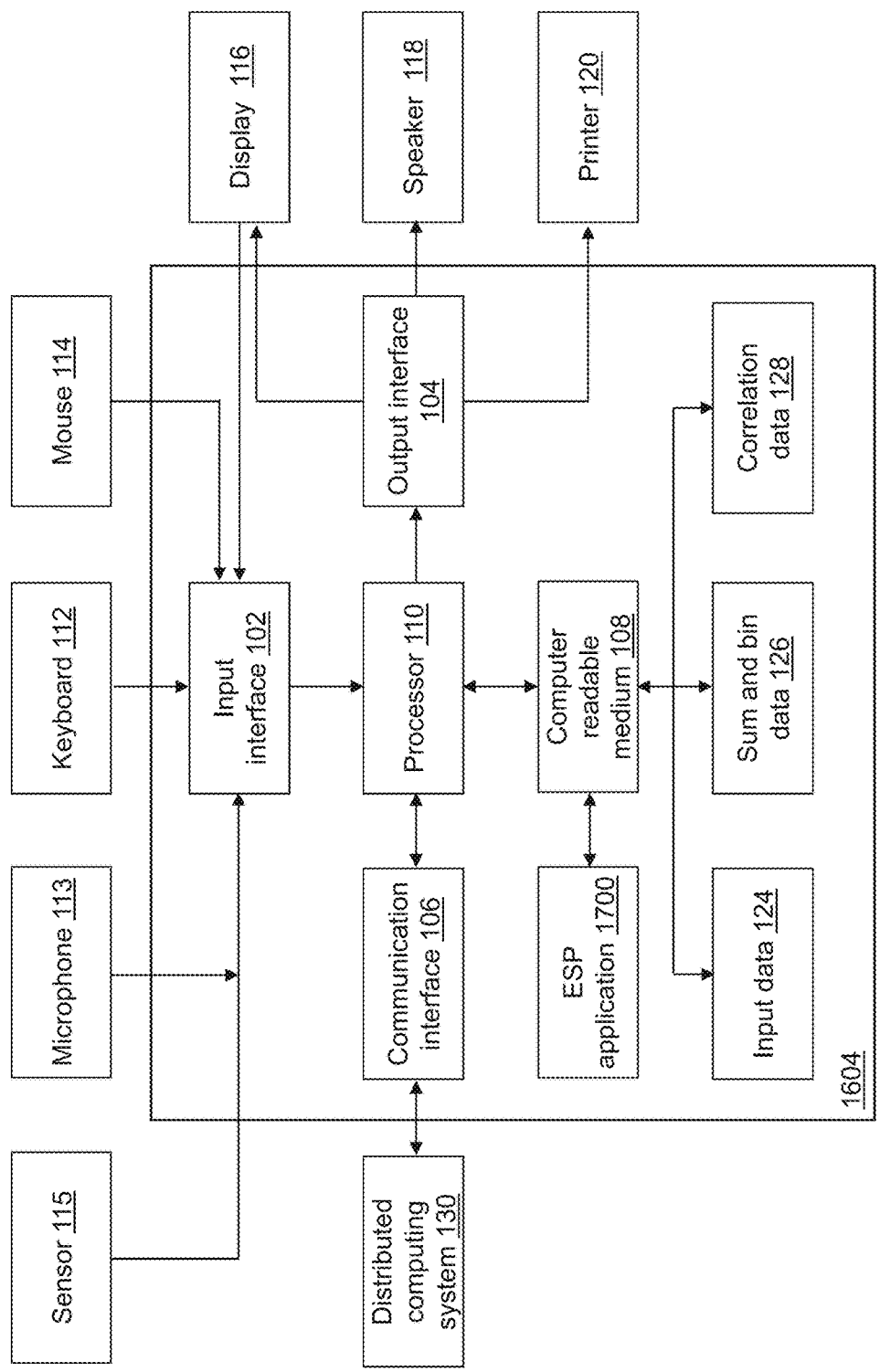
FIG. 17 depicts a block diagram of an event stream processing (ESP) device of FIG. 16 in accordance with an illustrative embodiment.

Referring to FIG. 17, a block diagram of ESP device 1604 is shown in accordance with an example embodiment. ESP device 1604 is similar to correlation update device 100 except that ESP device 1604 includes an ESP application 1700. Fewer, different, and additional components may be incorporated into event publishing device 2000. Distributed computing system 130 may generally reference event publishing system 1602 and event subscribing system 1606.

ESP application 1700 performs operations associated with establishing communication with event publishing system 1602 and event subscribing system 1606, with receiving and process a stream of event block objects from event publishing system 1602, and/or with streaming correlation updates to event subscribing system 1606. ESP application 1700 includes some or all of the operations of correlation update application 122. The operations may be implemented using hardware, firmware, software, or any combination of these methods. Referring to the example embodiment of FIG. 17, ESP application 1700 is implemented in software (comprised of computer-readable and/or computer-executable instructions) stored in computer-readable medium 108 and accessible by processor 110 for execution of the instructions that embody the operations of ESP application 1700. ESP application 1700 may be written using one or more programming languages, assembly languages, scripting languages, etc. ESP application 1700 may be implemented as a Web application.

Figure 18:
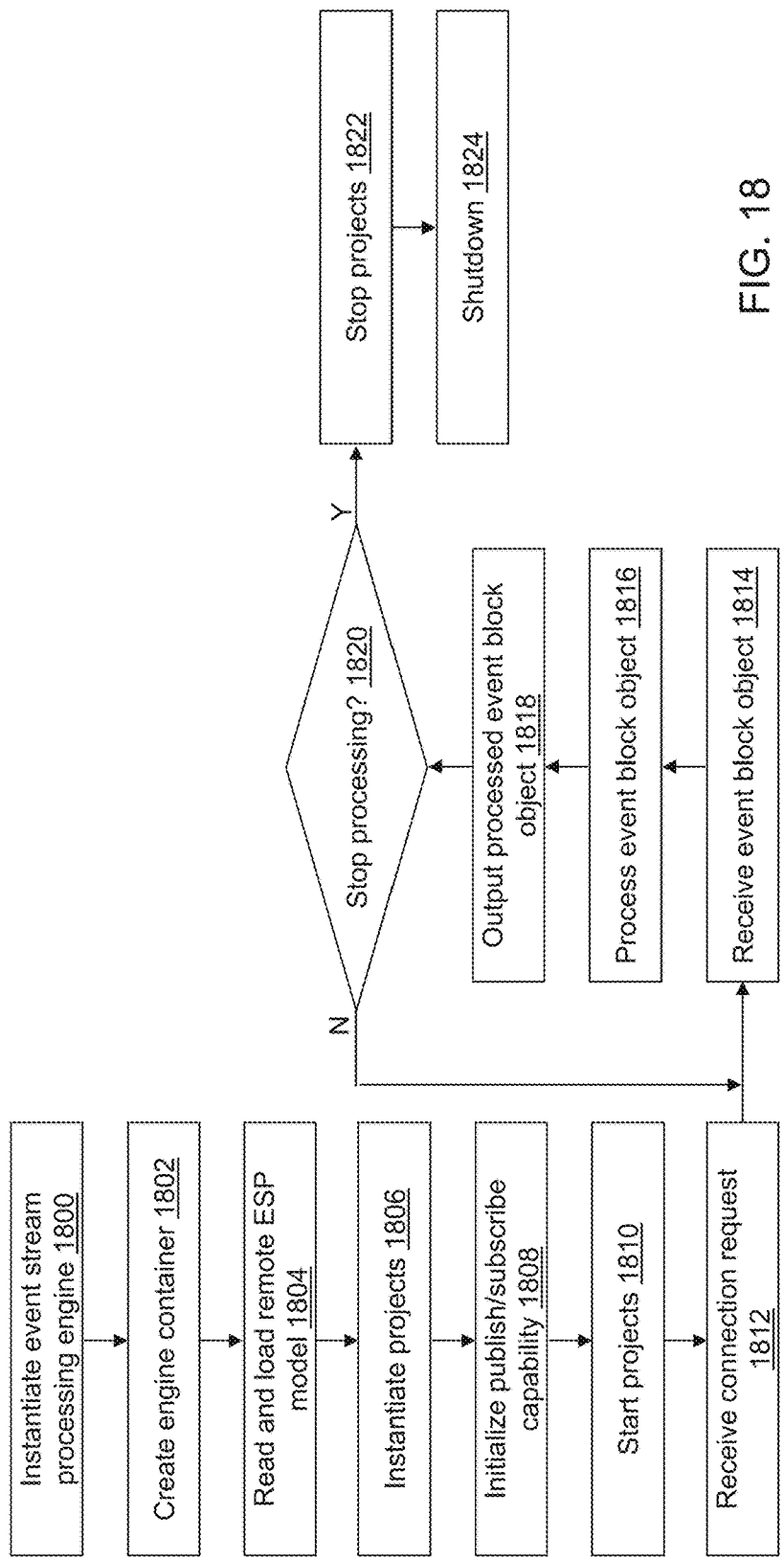
FIG. 18 depicts a flow diagram illustrating examples of operations performed by the ESP device of FIG. 17 in accordance with an illustrative embodiment.

Referring to FIG. 18, a flow diagram illustrating examples of operations performed by ESP application 1700 is shown in accordance with an illustrative embodiment. Additional, fewer, or different operations may be performed depending on the embodiment of ESP application 1700 and/or correlation update application 122. The order of presentation of the operations of FIG. 18 is not intended to be limiting. Although some of the operational flows are presented in sequence, the various operations may be performed in various repetitions, concurrently (in parallel, for example, using threads and/or distributed computing system 130), and/or in other orders than those that are illustrated. In an illustrative embodiment, ESP device 1604 is also configured to perform the operations of FIGS. 2A to 2F. For example, the data points for the paired variables of input data 124 may be received from event publishing device 2000. In operation 247 shown referring to FIG. 2B, correlation data 128 may be output to event subscribing device 2200.

Figure 19:
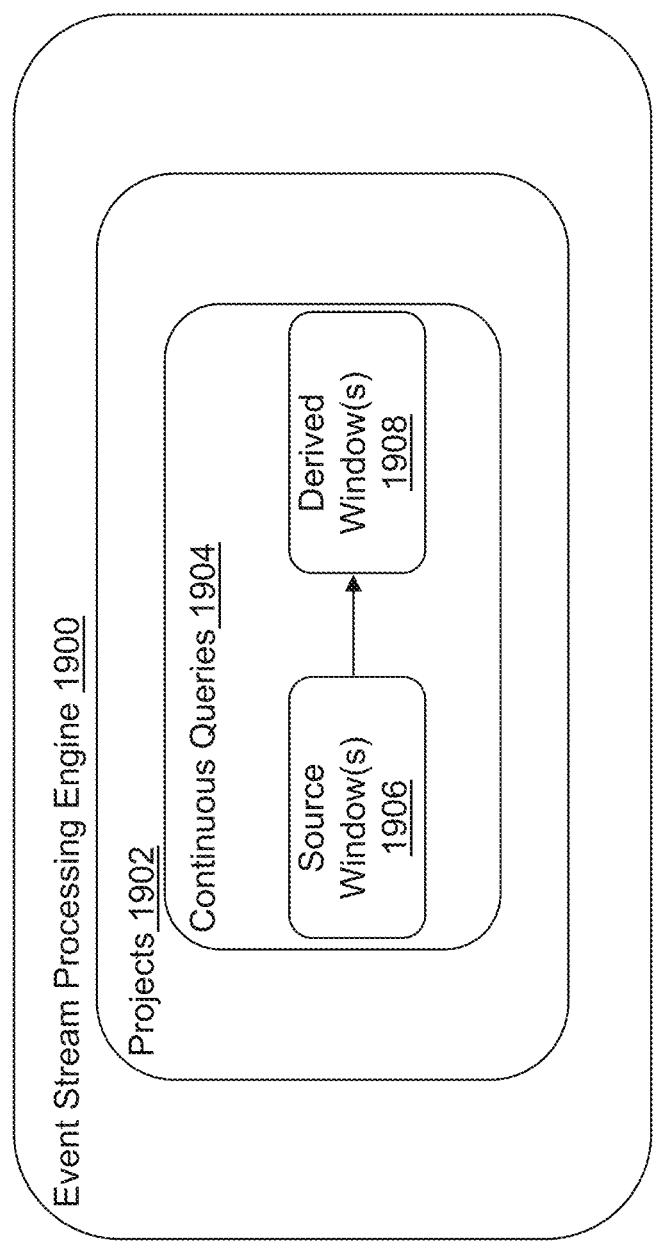
FIG. 19 depicts a block diagram of an ESP engine executing on the ESP device of FIG. 17 in accordance with an illustrative embodiment.

In an operation 1800, an ESP engine (ESPE) 1900 (shown referring to FIG. 19) is instantiated. For example, referring to FIG. 19, the components of ESPE 1900 executing at ESP device 1604 are shown in accordance with an illustrative embodiment. ESPE 1900 may include one or more projects 1902. A project may be described as a second-level container in an engine model managed by ESPE 1900 where a thread pool size for the project may be defined by a user. A value of one for the thread pool size indicates that writes are single-threaded. Each project of the one or more projects 1902 may include one or more continuous queries 1904 that contain data flows, which are data transformations of incoming event streams. The one or more continuous queries 1904 may include one or more source windows 1906 and one or more derived windows 1908.

The engine container is the top-level container in a model that manages the resources of the one or more projects 1902. Each ESPE 1900 has a unique engine name. Additionally, the one or more projects 1902 may each have unique project names, and each query may have a unique continuous query name and begin with a uniquely named source window of the one or more source windows 1906. Each ESPE 1900 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 1906 and the one or more derived windows 1908 represent continuously executing queries that generate updates to a query result set as new event blocks stream through ESPE 1900. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 1900 can support the opcodes for events including insert, update, upsert, and delete. As a result, events entering a source window of the one or more source windows 1906 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 2000, a data transmit time by event publishing device 2000, a data receipt time by ESP device 1604, etc.

An event block object may be described as a grouping or package of one or more event objects. An event stream may be described as a flow of event block objects. A continuous query of the one or more continuous queries 1904 transforms the incoming event stream made up of streaming event block objects published into ESPE 1900 into one or more outgoing event streams using the one or more source windows 1906 and the one or more derived windows 1908. A continuous query can also be thought of as data flow modeling.

The one or more source windows 1906 are at the top of the directed graph and have no windows feeding into them. Event streams are published into the one or more source windows 1906, and from there, the event streams are directed to the next set of connected windows as defined by the directed graph. The one or more derived windows 1908 are all instantiated windows that are not source windows and that have other windows streaming events into them. The one or more derived windows 1908 perform computations or transformations on the incoming event streams. The one or more derived windows 1908 transform event streams based on the window type (that is operators such as join, filter, compute, aggregate, copy, pattern match, procedural, union, etc.) and window settings. As event streams are published into ESPE 1900, they are continuously queried, and the resulting sets of derived windows in these queries are continuously updated. A compute type derived window, for example, may be defined to include one or more operations of FIGS. 2A to 2F to compute either or both of the Spearman's rank or the Kendall's tau correlation of paired variables included in an event stream received from event publishing system 1602.

Referring again to FIG. 18, in an operation 1802, the engine container may be created. For illustration, ESPE 1900 may be instantiated using a function call that specifies the engine container as a manager for the model. The function call may include the engine name for ESPE 1900 that may be unique to ESPE 1900.

In an operation 1804, an ESP model that may be stored locally to computer-readable medium 108 may be read and loaded.

In an operation 1806, the one or more projects 1902 defined by the ESP model may be instantiated. Instantiating the one or more projects 1902 also instantiates the one or more continuous queries 1904, the one or more source windows 1906, and the one or more derived windows 1908 defined from the ESP model. Based on the ESP model, ESPE 1900 may analyze and process events in motion or event streams. Instead of storing events and running queries against the stored events, ESPE 1900 may store queries and stream events through them to allow continuous analysis of data as it is received. The one or more source windows 1906 and the one or more derived windows 1908 defined from the ESP model may be created based on the relational, pattern matching, and procedural algorithms that transform the input event streams into the output event streams to model, simulate, score, test, predict, etc. based on the continuous query model defined by the ESP model and event publishing application 2022 that is streaming data to ESPE 1900.

In an operation 1808, the pub/sub capability may be initialized for ESPE 1900. In an illustrative embodiment, the pub/sub capability is initialized for each project of the one or more projects 1902. To initialize and enable pub/sub capability for ESPE 1900, a host name and a port number may be provided. The host name and the port number may be read from the ESP model. Pub/sub clients can use a host name and the port number of ESP device 1604 to establish pub/sub connections to ESPE 1900. For example, a server listener socket is opened for the port number to enable event subscribing system 1606 to connect to ESPE 1900 for pub/sub services. The host name and the port number of ESP device 1604 to establish pub/sub connections to ESPE 1900 may be referred to as the host:port designation of ESPE 1900 executing on ESP device 1604.

In an operation 1810, the one or more projects 1902 defined from the ESP model may be started. The one or more started projects may run in the background on ESP device 1604.

In an operation 1812, a connection request may be received from event publishing device 2000 for a source window to which data will be published. A connection request further is received from a computing device of event subscribing system 1606, for example, from event subscribing device 2200.

In an operation 1814, an event block object is received from event publishing device 2000. An event block object containing one or more event objects is injected into a source window of the one or more source windows 1906 defined from the ESP model.

In an operation 1816, the received event block object is processed through the one or more continuous queries 1904. The unique ID assigned to the event block object by event publishing device 2000 is maintained as the event block object is passed through ESPE 1900 and between the one or more source windows 1906 and/or the one or more derived windows 1908 of ESPE 1900. A unique embedded transaction ID further may be embedded in the event block object as the event block object is processed by a continuous query. ESPE 1900 maintains the event block containership aspect of the received event blocks from when the event block is published into a source window and works its way through the directed graph defined by the one or more continuous queries 1904 with the various event translations before being output to event subscribing device 2200.

For illustration, one or more of the operations of FIGS. 2A to 2F are made available in a calculate type derived window of ESPE 1900. The calculate type derived window receives data from a source window and computes an update to the bin matrix and/or the correlation value. Initially, operations 200 to 232 may be performed possibly by aggregating the burn-in number of observations from received event block objects before executing operations 234 to 248 with the selected operations 250 to 269 and/or 270 to 287. The number of observations per object T processed as a group further may be accumulated from one or more event block objects. Each time a new event block object is received into the calculate type derived window implementing the one or more operations of FIGS. 2A to 2F, the appropriate data within the received event block object is extracted and the bin matrix and/or the correlation value is updated based on the extracted data. An output from the calculate type derived window may be correlation data 128 as described in operation 247 of FIG. 2B.

In an operation 1818, the processed event block object is output to one or more subscribing devices of event subscribing system 1608 such as event subscribing device 2200. Subscribing devices can correlate a group of subscribed event block objects back to a group of published event block objects by comparing the unique ID of the event block object that a publisher, such as event publishing device 2000, attached to the event block object with the event block ID received by event subscribing device 2200. The received event block objects further may be stored, for example, in a RAM or cache type memory of computer-readable medium 108 such as in input data 124.

In an operation 1820, a determination is made concerning whether or not processing is stopped. If processing is not stopped, processing continues in operation 1814 to continue receiving the one or more event streams containing event block objects from event publishing device 2000. If processing is stopped, processing continues in an operation 1822.

In operation 1822, the started projects are stopped.

In an operation 1824, ESPE 1900 is shutdown.

Figure 20:
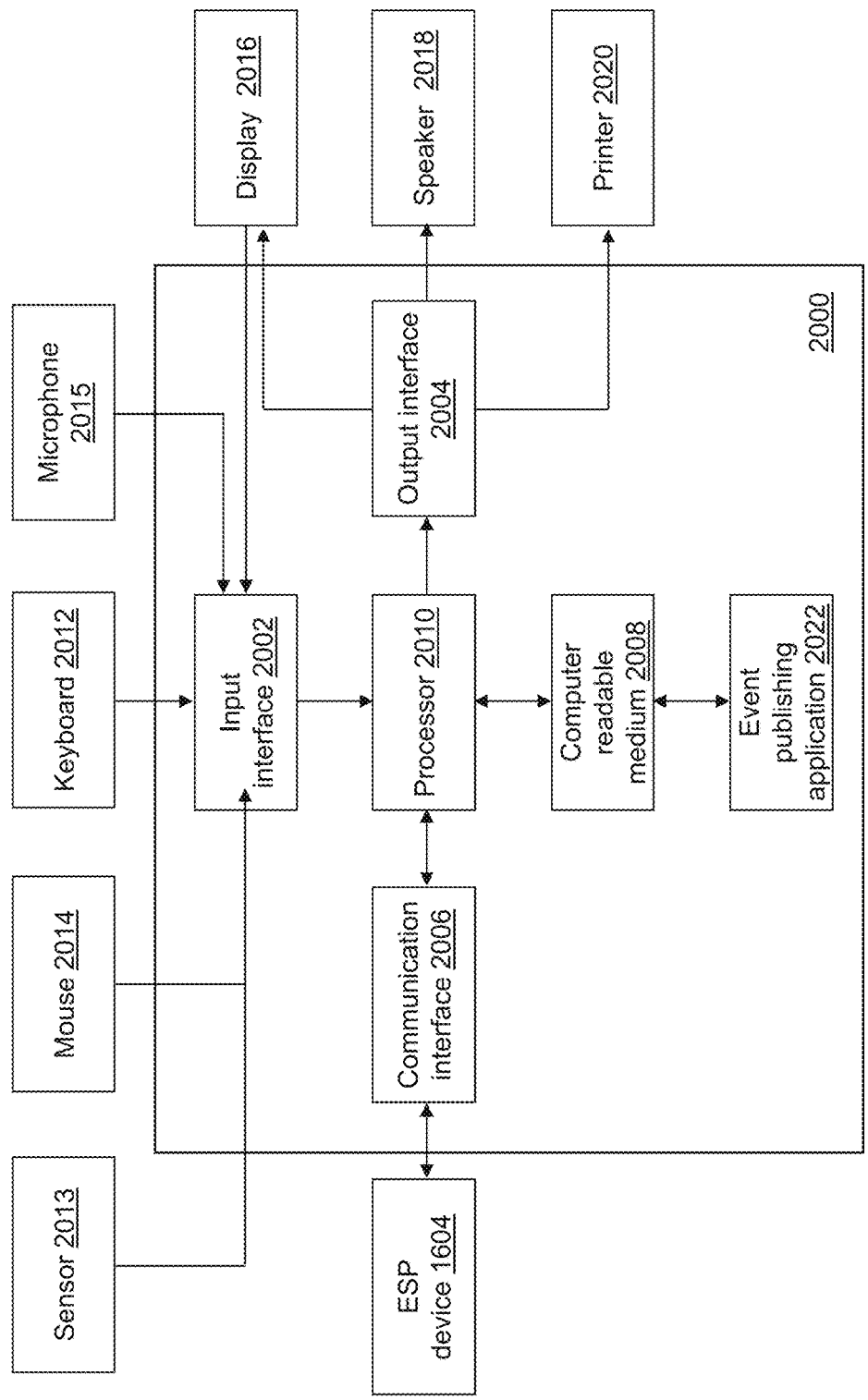
FIG. 20 depicts a block diagram of an event publishing device of an event publishing system of the stream processing system of FIG. 16 in accordance with an illustrative embodiment.

Referring to FIG. 20, a block diagram of an event publishing device 2000 of event publishing system 1602 is shown in accordance with an example embodiment. Event publishing device 2000 is an example computing device of event publishing system 1602. For example, each of server computer 1612, desktop 1614, smart phone 1616, and laptop 1618 may be an instance of event publishing device 2000. Event publishing device 2000 may include a second input interface 2002, a second output interface 2004, a second communication interface 2006, a second computer-readable medium 2008, a second processor 2010, and event publishing application 2022. Each event publishing device 2000 of event publishing system 1602 may include the same or different components and combinations of components. Fewer, different, and additional components may be incorporated into event publishing device 2000.

Second input interface 2002 provides the same or similar functionality as that described with reference to input interface 102 of correlation update device 100 though referring to event publishing device 2000. Second output interface 2004 provides the same or similar functionality as that described with reference to output interface 104 of correlation update device 100 though referring to event publishing device 2000. Second communication interface 2006 provides the same or similar functionality as that described with reference to communication interface 106 of correlation update device 100 though referring to event publishing device 2000. Data and messages may be transferred between event publishing device 2000 and ESP device 1604 using second communication interface 2006. Second computer-readable medium 2008 provides the same or similar functionality as that described with reference to computer-readable medium 108 of correlation update device 100 though referring to event publishing device 2000. Second processor 2010 provides the same or similar functionality as that described with reference to processor 110 of correlation update device 100 though referring to event publishing device 2000.

Event publishing application 2022 performs operations associated with generating, capturing, and/or receiving measurement data value and publishing the measurement data value in an event stream to one or more computing devices of event subscribing system 1606 directly or indirectly through ESP device 1604. The operations may be implemented using hardware, firmware, software, or any combination of these methods. Referring to the example embodiment of FIG. 20, event publishing application 2022 is implemented in software (comprised of computer-readable and/or computer-executable instructions) stored in second computer-readable medium 2008 and accessible by second processor 2010 for execution of the instructions that embody the operations of event publishing application 2022. Event publishing application 2022 may be written using one or more programming languages, assembly languages, scripting languages, etc. Event publishing application 2022 may be implemented as a Web application.

Figure 21:
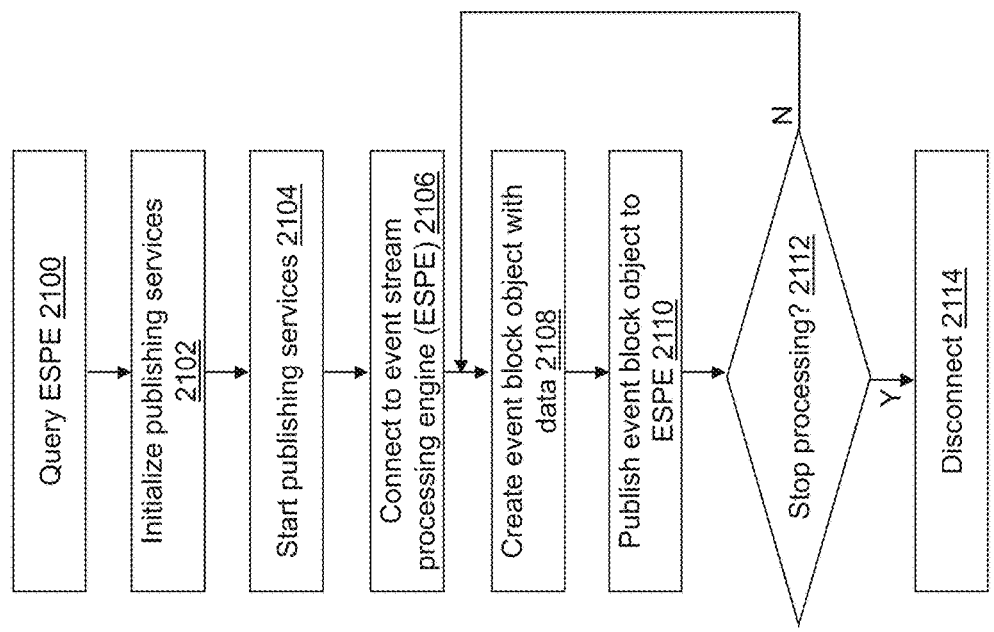
FIG. 21 depicts a flow diagram illustrating examples of operations performed by the event publishing device of FIG. 20 in accordance with an illustrative embodiment.

Referring to FIG. 21, example operations associated with event publishing application 2022 are described. Additional, fewer, or different operations may be performed depending on the embodiment. The order of presentation of the operations of FIG. 21 is not intended to be limiting. A user can interact with one or more user interface windows presented to the user in a display under control of event publishing application 2022 independently or through a browser application in an order selectable by the user. Although some of the operational flows are presented in sequence, the various operations may be performed in various repetitions, concurrently, and/or in other orders than those that are illustrated. For example, a user may execute event publishing application 2022, which causes presentation of a first user interface window, which may include a plurality of menus and selectors such as drop-down menus, buttons, text boxes, hyperlinks, etc. associated with event publishing application 2022 as understood by a person of skill in the art. As further understood by a person of skill in the art, various operations may be performed in parallel, for example, using a plurality of threads or a plurality of computing devices such as a grid or a cloud of computing devices.

In an operation 2100, ESPE 1900 is queried, for example, to discover projects 1902, continuous queries 1904, windows 1906, 1908, window schema, and window edges currently running in ESPE 1900. The engine name and host/port to ESPE 1900 may be provided as an input to the query and a list of strings may be returned with the names of the projects 1902, of the continuous queries 1904, of the windows 1906, 1908, of the window schema, and/or of the window edges of currently running projects on ESPE 1900. The host is associated with a host name or Internet Protocol (IP) address of ESP device 1604. The port is the port number provided when a publish/subscribe (pub/sub) capability is initialized by ESPE 1900. The engine name is the name of ESPE 1900. The engine name of ESPE 1900 and host/port to ESP device 1604 may be read from a storage location on second computer-readable medium 2008, may be provided on a command line, or otherwise input to or defined by event publishing application 2022 as understood by a person of skill in the art.

In an operation 2102, publishing services are initialized.

In an operation 2104, the initialized publishing services are started, which may create a publishing client for the instantiated event publishing application 2022. The publishing client performs the various pub/sub activities for the instantiated event publishing application 2022. For example, a string representation of a URL to ESPE 1900 is passed to a "Start" function. For example, the URL may include the host:port designation of ESPE 1900 executing at ESP device 1604, a project of the projects 1902, a continuous query of the continuous queries 1904, and a window of the source windows 1906. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 2022 is publishing to more than one source window of ESPE 1900, the initialized publishing services may be started to each source window using the associated names (project name, continuous query name, source window name).

Pub/sub is a message-oriented interaction paradigm based on indirect addressing. Processed data recipients (event subscribing system 1606) specify their interest in receiving information from ESPE 1900 by subscribing to specific classes of events, while information sources (event publishing system 1602) publish events to ESPE 1900 without directly addressing the data recipients.

In an operation 2106, a connection is made between event publishing application 2022 and ESPE 1900 for each source window of the source windows 1906 to which any measurement data value is published. To make the connection, the pointer to the created publishing client may be passed to a "Connect" function. If event publishing application 2022 is publishing to more than one source window of ESPE 1900, a connection may be made to each started window using the pointer returned for the respective "Start" function call.

In an operation 2108, an event block object is created by event publishing application 2022 that includes a measurement data value. The measurement data value may have been received, captured, generated, etc., for example, through second communication interface 2006 or second input interface 2002 or by second processor 2010. The measurement data value may be processed before inclusion in the event block object, for example, to change a unit of measure, convert to a different reference system, etc. The event block object may include a plurality of measurement data values measured at different times and/or by different devices.

In an operation 2110, the created event block object is published to ESPE 1900, for example, using the pointer returned for the respective "Start" function call to the appropriate source window. Event publishing application 2022 passes the created event block object to the created publishing client, where the unique ID field in the event block object has been set by event publishing application 2022 possibly after being requested from the created publishing client. In an illustrative embodiment, event publishing application 2022 may wait to begin publishing until a "Ready" callback has been received from the created publishing client. The event block object is injected into the source window, continuous query, and project associated with the started publishing client.

In an operation 2112, a determination is made concerning whether or not processing is stopped. If processing is not stopped, processing continues in operation 2108 to continue creating and publishing event block objects that include measurement data values. If processing is stopped, processing continues in an operation 2114.

In operation 2114, the connection made between event publishing application 2022 and ESPE 1900 through the created publishing client is disconnected, and each started publishing client is stopped.

Figure 22:
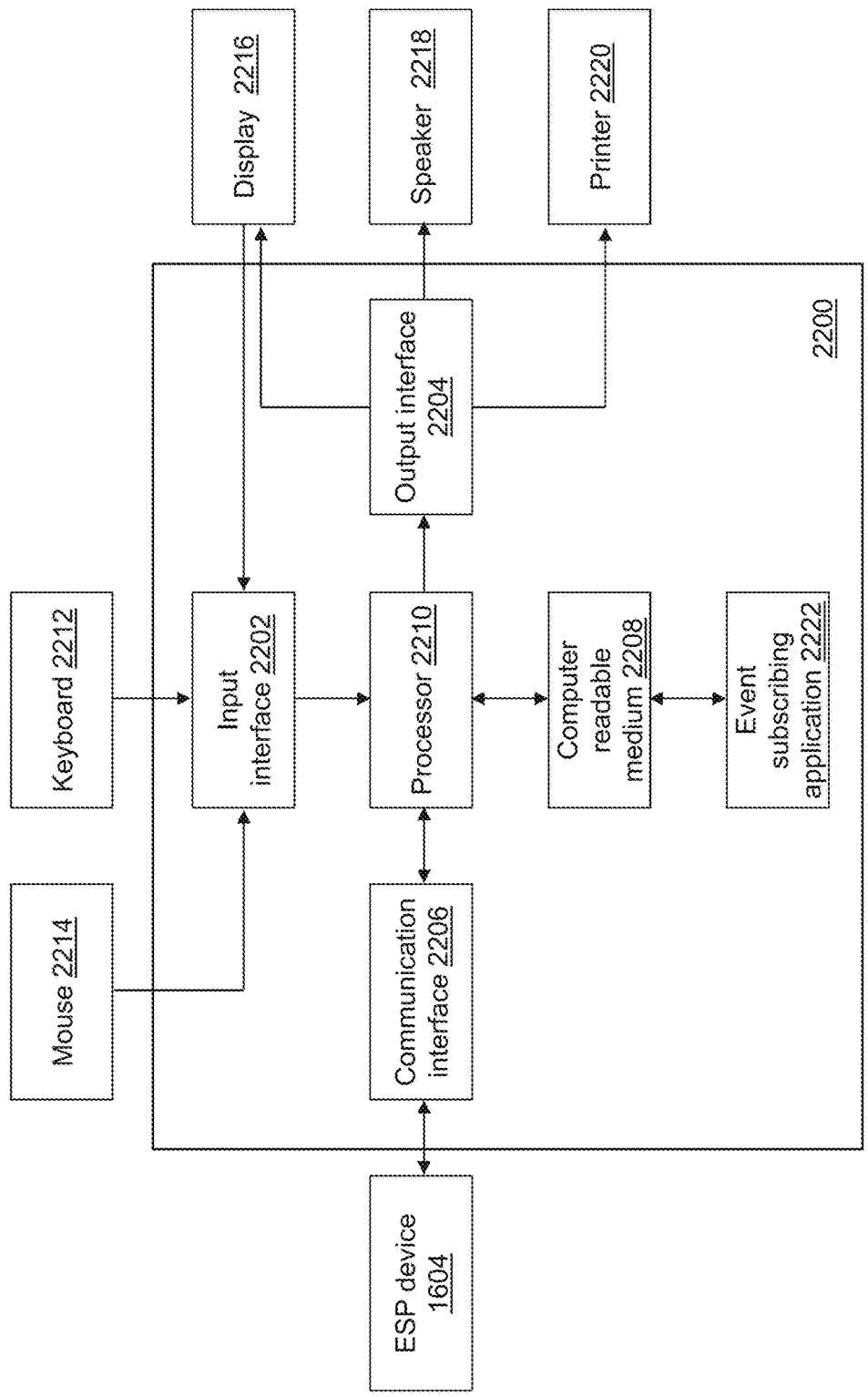
FIG. 22 depicts a block diagram of an event subscribing device of an event subscribing system of the stream processing system of FIG. 16 in accordance with an illustrative embodiment.

Referring to FIG. 22, a block diagram of an event subscribing device 2200 is shown in accordance with an example embodiment. Event subscribing device 2200 is an example computing device of event subscribing system 1606. For example, each of smart phone 1620, desktop 1622, server computer 1624, and laptop 1626 may be an instance of event subscribing device 2200. Event subscribing device 2200 may include a third input interface 2202, a third output interface 2204, a third communication interface 2206, a third computer-readable medium 2208, a third processor 2210, and an event subscribing application 2222. Fewer, different, and additional components may be incorporated into event subscribing device 2200. Each event subscribing device 2200 of event subscribing system 1606 may include the same or different components or combination of components.

Third input interface 2202 provides the same or similar functionality as that described with reference to input interface 102 of correlation update device 100 though referring to event subscribing device 2200. Third output interface 2204 provides the same or similar functionality as that described with reference to output interface 104 of correlation update device 100 though referring to event subscribing device 2200. Third communication interface 2206 provides the same or similar functionality as that described with reference to communication interface 106 of correlation update device 100 though referring to event subscribing device 2200. Data and messages may be transferred between event subscribing device 2200 and ESP device 1604 using third communication interface 2206. Third computer-readable medium 2208 provides the same or similar functionality as that described with reference to computer-readable medium 108 of correlation update device 100 though referring to event subscribing device 2200. Third processor 2210 provides the same or similar functionality as that described with reference to processor 110 of correlation update device 100 though referring to event subscribing device 2200.

Figure 23:
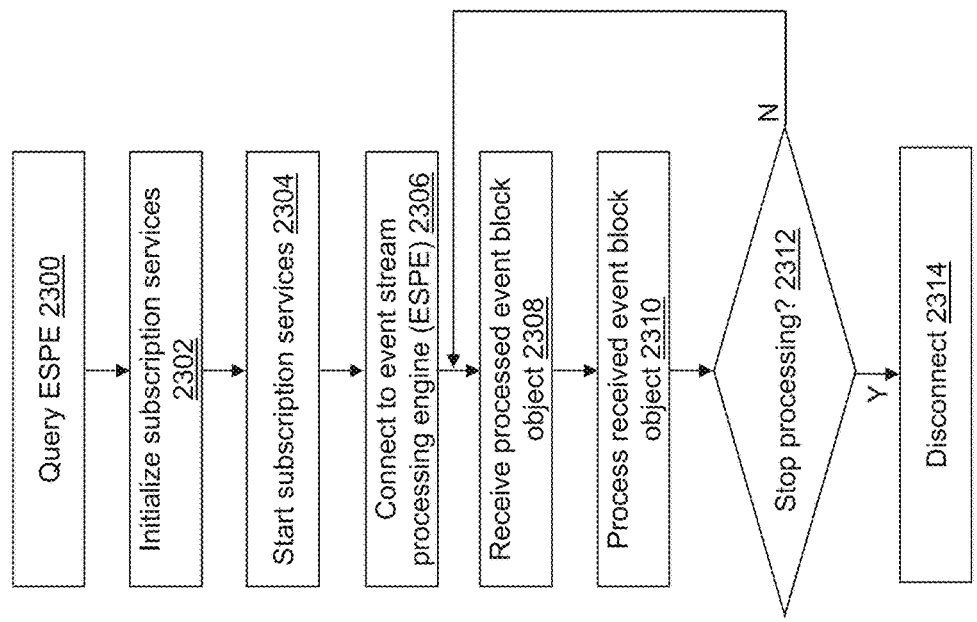
FIG. 23 depicts a flow diagram illustrating examples of operations performed by the event subscribing device of FIG. 22 in accordance with an illustrative embodiment.

Referring to FIG. 23, example operations associated with event subscribing application 2222 are described. Additional, fewer, or different operations may be performed depending on the embodiment. The order of presentation of the operations of FIG. 23 is not intended to be limiting.

Similar to operation 2100, in an operation 2300, ESPE 1900 is queried, for example, to discover names of projects 1902, of continuous queries 1904, of windows 1906, 1908, of window schema, and of window edges currently running in ESPE 1900. The host name of ESP device 1604, the engine name of ESPE 1900, and the port number opened by ESPE 1900 are provided as an input to the query and a list of strings may be returned with the names to the projects 1902, continuous queries 1904, windows 1906, 1908, window schema, and/or window edges.

In an operation 2102, subscription services are initialized.

In an operation 2104, the initialized subscription services are started, which may create a subscribing client on behalf of event subscribing application 2222 at event subscribing device 2200. The subscribing client performs the various pub/sub activities for event subscribing application 2222. For example, a URL to ESPE 1900 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 2106, a connection may be made between event subscribing application 2222 executing at event subscribing device 2200 and ESPE 1900 through the created subscribing client. To make the connection, the pointer to the created subscribing client may be passed to a "Connect" function and a mostly non-busy wait loop created to wait for receipt of event block objects.

In an operation 2108, an event block object is received by event subscribing application 2222 executing at event subscribing device 2200.

In an operation 2110, the received event block object is processed based on the operational functionality provided by event subscribing application 2222. For example, event subscribing application 2222 may extract data from the received event block object and store the extracted data in a database. In addition, or in the alternative, event subscribing application 2222 may extract data from the received event block object and send the extracted data to a system control operator display system, an automatic control system, a notification device, an analytic device, etc. In addition, or in the alternative, event subscribing application 2222 may extract data from the received event block object and send the extracted data to a post-incident analysis device to further analyze the data. Event subscribing application 2222 may perform any number of different types of actions as a result of extracting data from the received event block object. The action may involve presenting information on a third display 2216 or a third printer 2220, presenting information using a third speaker 2218, storing data in third computer-readable medium 2208, sending information to another device using third communication interface 2206, etc. A user may further interact with presented information using a third mouse 2214 and/or a third keyboard 2212.

In an operation 2112, a determination is made concerning whether or not processing is stopped. If processing is not stopped, processing continues in operation 2108 to continue receiving and processing event block objects. If processing is stopped, processing continues in an operation 2114.

In operation 2114, the connection made between event subscribing application 2222 and ESPE 1900 through the subscribing client is disconnected, and the subscribing client is stopped.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (a) receive a first value of a first variable from a first computing device connected to the computing device through a communication interface in an event block object of an event stream;
   (b) receive a second value of a second variable from the first computing device connected to the computing device through the communication interface in the event block object, wherein the first value and the second value define a single observation;
   (c) determine a row index based on the received first value and on first predefined variable bin boundaries;
   (d) determine a column index based on the received second value and on second predefined variable bin boundaries;
   (e) increment a bin data value of bin data, wherein the bin data value is selected based on the determined row index and the determined column index, wherein the bin data is stored in the non-transitory computer-readable medium as a bin matrix having a predefined number of rows and a predefined number of columns based on the first predefined variable bin boundaries and the second predefined variable bin boundaries, respectively;
   (f) increment a row sum value of a row sum vector, wherein the row sum value is selected based on the determined row index, wherein the row sum vector has the predefined number of rows;
   (g) increment a column sum value of a column sum vector, wherein the column sum value is selected based on the determined column index, wherein the column sum vector has the predefined number of columns;
   (h) increment an observation counter value;
   (i) compute a nonparametric correlation value between the first variable and the second variable using the bin data, the row sum vector, the column sum vector, and the observation counter value; and
   (j) output the computed nonparametric correlation value to a second device connected to the computing device through the communication interface, wherein (a) to (j) are performed by an event stream processing engine instantiated at the computing device.

2. The non-transitory computer-readable medium of claim 1, wherein (d) is performed before (c).

3. The non-transitory computer-readable medium of claim 1, wherein before (i), the computer-readable instructions further cause the computing device to Q repeat (a) to (h) for a predefined number of observations per correlation computation.

4. The non-transitory computer-readable medium of claim 3, wherein before (j), the computer-readable instructions further cause the computing device to (l) repeat (a) to (i) and (k) for a predefined number of observations, wherein the nonparametric correlation value computed for each observation of the predefined number of observations is output.

5. The non-transitory computer-readable medium of claim 1, wherein the first predefined variable bin boundaries are selected by a user.

6. The non-transitory computer-readable medium of claim 1, wherein the first predefined variable bin boundaries are computed based on a number of first variable bins.

7. The non-transitory computer-readable medium of claim 6, wherein, before (a), the computer-readable instructions further cause the computing device to:
   receive a plurality of first values of the first variable; and
   compute the first predefined variable bin boundaries as equally spaced quantiles of the received plurality of first values of the first variable, where a number of the quantiles is the number of first variable bins.

8. The non-transitory computer-readable medium of claim 7, wherein the second predefined variable bin boundaries are selected by a user.

9. The non-transitory computer-readable medium of claim 7, wherein the second predefined variable bin boundaries are computed based on a number of second variable bins.

10. The non-transitory computer-readable medium of claim 9, wherein, before (a), the computer-readable instructions further cause the computing device to:
    receive a plurality of second values of the second variable; and
    compute the second predefined variable bin boundaries as equally spaced second quantiles of the received plurality of second values of the second variable, where a number of the second quantiles is the number of second variable bins.

11. The non-transitory computer-readable medium of claim 1, wherein the first value of the first variable is extracted from the event block object created by the first computing device and streamed to the computing device.

12. The non-transitory computer-readable medium of claim 11, wherein the event block object is one of a plurality of event block objects streamed to the computing device from the first computing device, wherein each event block object of the plurality of event block objects includes the first value or the second value.

13. The non-transitory computer-readable medium of claim 1, wherein the first computing device includes a sensor configured to measure a sensed value from which the first value or the second value is determined.

14. The non-transitory computer-readable medium of claim 1, wherein the second device is a second computing device, wherein the computed nonparametric correlation value is streamed to the second computing device.

15. The non-transitory computer-readable medium of claim 1, wherein the second device is a second computing device, wherein the computed nonparametric correlation value is stored to an output data file stored in a second, non-transitory computer-readable medium of the second computing device.

16. The non-transitory computer-readable medium of claim 1, wherein the second device is a display, wherein the computed nonparametric correlation value is presented on the display.

17. The non-transitory computer-readable medium of claim 1, wherein, after (h), the computer-readable instructions further cause the computing device to:
(aa) determine that (a) to (h) has been performed on a predefined number of observations;
(ab) determine an oldest row index of an oldest first value;
(ac) determine an oldest column index of an oldest second value;
(ad) decrement a second bin data value of the bin data, wherein the second bin data value is selected based on the determined oldest row index and the determined oldest column index;
(ae) update the oldest first value with a next oldest first value; and
(af) update the oldest second value with a next oldest second value.

18. The non-transitory computer-readable medium of claim 17, wherein before (i), the computer-readable instructions further cause the computing device to repeat (a) to (h) and (aa) to (af) for a predefined number of observations per correlation computation.

19. The non-transitory computer-readable medium of claim 17, wherein before (j), the computer-readable instructions further cause the computing device to repeat (a) to (i) and (aa) to (af) for a second predefined number of observations.

20. The non-transitory computer-readable medium of claim 1, wherein the nonparametric correlation value is computed as a Spearman's rank correlation.

21. The non-transitory computer-readable medium of claim 20, wherein computing the Spearman's rank correlation comprises:
computing a row rank vector from the row sum vector, wherein the row rank vector has the predefined number of rows, wherein the row rank vector defines a rank of each row of the row sum vector;
computing a column rank vector from the column sum vector, wherein the column rank vector has the predefined number of columns, wherein the column rank vector defines a rank of each column of the column sum vector;
computing a first row vector $r_{1r}$ using $$r_{1r}[i] = r_r[i] - \frac{n+1}{2},$$

i=1, ..., m1, where m1 is the predefined number of rows, $r_r$ is the computed row rank vector, and n is the observation counter value;
computing a second row vector $r_{2r}$ using $r_{2r}[i]=r_{1r}[i]/C_1$, i=1, ..., m1, where $C_1=\sqrt{\sum_{i=1}^{m1} n_r[i](r_{1r}[i])^2}$, and $n_r$ is the row sum vector;
computing a first column vector $r_{1c}$ using $$r_{1c}[j] = r_c[j] - \frac{n+1}{2},$$

j=1, ..., m2, where m2 is the predefined number of columns, and $r_c$ is the computed column rank vector; and
computing a second column vector $r_{2c}$ using $r_{2c}[j]=r_{1c}[j]/C_2$, j=1, ..., m2, where $C_2=\sum_{j=1}^{m2} n_c[j](r_{1c}[j])^2$, and $n_c$ is the column sum vector, wherein the nonparametric correlation value $c_S$ is computed using $c_S = r_{2r}^T M r_{2c}$, where M is the bin matrix.

22. The non-transitory computer-readable medium of claim 1, wherein the nonparametric correlation value is computed as a Kendall's tau correlation.

23. The non-transitory computer-readable medium of claim 22, wherein computing the Kendall's tau correlation comprises:
computing a number of concordant pairs P using $P=\sum_{i=1}^{m1}\sum_{j=1}^{m2}M[i,j]*\sum_{l1=1}^{i-1}\sum_{l2=1}^{j-1}M[l1,l2]$, where M is the bin matrix, m1 is the predefined number of rows, and m2 is the predefined number of columns;
computing a number of only first variable ties T using $T=[\sum_{i=1}^{m1}((n_r[i])^2-\sum_{j=1}^{m2}(M[i,j])^2)]/2$, where $n_r$ is the row sum vector;
computing a number of only second variable ties U using $U=[\sum_{j=1}^{m2}((n_c[j])^2-\sum_{i=1}^{m1}(M[i,j])^2)]/2$, where $n_c$ is the column sum vector;
computing a number of first variable and second variable ties B using $B=\sum_{i=1}^{m1}\sum_{j=1}^{m2}M[i,j]*(M[i,j]-1)/2$; and
computing a number of discordant pairs Q using $$Q = \left((n+1)*\frac{n}{2}\right) - P - T - U - B,$$

where n is the observation counter value;
wherein the nonparametric correlation value $C_K$ is computed using $C_K=(P-Q)/\sqrt{(P+Q+T)*(P+Q+U)}$.

24. The non-transitory computer-readable medium of claim 1, wherein the first variable or the second variable describes a characteristic of a physical object measured by a sensor in communication with the first computing device.

25. The non-transitory computer-readable medium of claim 4, wherein the computer-readable instructions further cause the computing device to repeat (a) to (l) until the event stream is stopped.

26. A method of iteratively updating a correlation between measured quantities, the method comprising:
(a) receiving, by a computing device, a first value of a first variable from a first computing device connected to the computing device through a communication interface in an event block object of an event stream;
(b) receiving, by the computing device, a second value of a second variable from the first computing device connected to the computing device through the communication interface in the event block object, wherein the first value and the second value define a single observation;
(c) determining, by the computing device, a row index based on the received first value and on first predefined variable bin boundaries;
(d) determining, by the computing device, a column index based on the received second value and on second predefined variable bin boundaries;
(e) incrementing, by the computing device, a bin data value of bin data, wherein the bin data value is selected based on the determined row index and the determined column index, wherein the bin data is stored in the non-transitory computer-readable medium as a bin matrix having a predefined number of rows and a predefined number of columns based on the first predefined variable bin boundaries and the second predefined variable bin boundaries, respectively;
(f) incrementing, by the computing device, a row sum value of a row sum vector, wherein the row sum value is selected based on the determined row index, wherein the row sum vector has the predefined number of rows;

(g) incrementing, by the computing device, a column sum value of a column sum vector, wherein the column sum value is selected based on the determined column index, wherein the column sum vector has the predefined number of columns;

(h) incrementing, by the computing device, an observation counter value;

(i) computing, by the computing device, a nonparametric correlation value between the first variable and the second variable using the bin data, the row sum vector, the column sum vector, and the observation counter value; and (j) outputting, by the computing device, the computed nonparametric correlation value to a second device connected to the computing device through the communication interface, wherein (a) to (j) are performed by an event stream processing engine instantiated at the computing device.

27. The method of claim 26, wherein the nonparametric correlation value is computed as a Spearman's rank correlation and computing the Spearman's rank correlation comprises:
computing a row rank vector from the row sum vector, wherein the row rank vector has the predefined number of rows, wherein the row rank vector defines a rank of each row of the row sum vector;
computing a column rank vector from the column sum vector, wherein the column rank vector has the predefined number of columns, wherein the column rank vector defines a rank of each column of the column sum vector;
computing a first row vector $r_{1r}$ using $$r_{1r}[i] = r_r[i] - \frac{n+1}{2},$$

i=1, . . . , m1, where m1 is the predefined number of rows, $r_r$ is the computed row rank vector, and n is the observation counter value;
computing a second row vector $r_{2r}$ using $r_{2r}[i]=r_{1r}[i]/C_1$, i=1, . . . , m1, where $C_1=\Sigma_{i=1}^{m1}n_r[i](r_{1r}[i])^2$, and $n_r$ is the row sum vector;
computing a first column vector $r_{1c}$ using $$r_{1c}[j] = r_c[j] - \frac{n+1}{2},$$

j=1, . . . , m2, where m2 is the predefined number of columns, and $r_c$ is the computed column rank vector; and
computing a second column vector $r_{2c}$ using $r_{2c}[j]=r_{1c}[j]/C_2$, j=1, . . . , m2, where $C_2=\sqrt{\Sigma_{j=1}^{m2}n_c[j](r_{1c}[j])^2}$, $n_c$ is the column sum vector,
wherein the nonparametric correlation value $c_S$ is computed using $c_S=r_{2r}^T M r_{2c}$, where M is the bin matrix.

28. The method of claim 26, wherein the nonparametric correlation value is computed as a Kendall's tau correlation and computing the Kendall's tau correlation comprises:
computing a number of concordant pairs P using $P=\Sigma_{i=1}^{m1}\Sigma_{j=1}^{m2}M[i,j]*\Sigma_{l1=1}^{i-1}\Sigma_{l2=1}^{j-1}M[l1,l2]$, where M is the bin matrix, m1 is the predefined number of rows, and m2 is the predefined number of columns;

computing a number of only first variable ties T using $T=[\Sigma_{i=1}^{m1}((n_r[i])^2-\Sigma_{j=1}^{m2}(M[i,j])^2)]/2$, where $n_r$ is the row sum vector;
computing a number of only second variable ties U using $U=[\Sigma_{j=1}^{m2}((n_c[j])^2-\Sigma_{i=1}^{m1}(M[i,j])^2)]/2$, where $n_c$ is the column sum vector;
computing a number of first variable and second variable ties B using $B=\Sigma_{i=1}^{m1}\Sigma_{j=1}^{m2}M[i,j]*(M[i,j]-1)/2$; and
computing a number of discordant pairs Q using $$Q = \left((n+1)*\frac{n}{2}\right) - P - T - U - B,$$

where n is the observation counter value;
wherein the nonparametric correlation value $C_K$ is computed using $C_K=(P-Q)/\sqrt{(P+Q+T)*(P+Q+U)}$.

29. The method of claim 26, wherein, before (a), the computer-readable instructions further cause the computing device to:
receive a plurality of first values of the first variable; and
compute the first predefined variable bin boundaries as equally spaced quantiles of the received plurality of first values of the first variable, where a number of the equally spaced quantiles is the predefined number of rows minus one.

30. A computing device comprising:
a processor; and
a non-transitory computer-readable medium operably coupled to the processor, the computer-readable medium having computer-readable instructions stored thereon that, when executed by the processor, cause the computing device to
(a) receive a first value of a first variable from a first computing device connected to the computing device through a communication interface in an event block object of an event stream;
(b) receive a second value of a second variable from the first computing device connected to the computing device through the communication interface in the event block object, wherein the first value and the second value define a single observation;
(c) determine a row index based on the received first value and on first predefined variable bin boundaries;
(d) determine a column index based on the received second value and on second predefined variable bin boundaries;
(e) increment a bin data value of bin data, wherein the bin data value is selected based on the determined row index and the determined column index, wherein the bin data is stored in the non-transitory computer-readable medium as a bin matrix having a predefined number of rows and a predefined number of columns based on the first predefined variable bin boundaries and the second predefined variable bin boundaries, respectively;
(f) increment a row sum value of a row sum vector, wherein the row sum value is selected based on the determined row index, wherein the row sum vector has the predefined number of rows;
(g) increment a column sum value of a column sum vector, wherein the column sum value is selected based on the determined column index, wherein the column sum vector has the predefined number of columns;
(h) increment an observation counter value;

(i) compute a nonparametric correlation value between the first variable and the second variable using the bin data, the row sum vector, the column sum vector, and the observation counter value; and (j) output the computed nonparametric correlation value to a second device connected to the computing device through the communication interface, wherein (a) to (j) are performed by an event stream processing engine instantiated at the computing device.

* * * * *

UNITED STATES PATENT AND TRADEMARK OFFICE
CERTIFICATE OF CORRECTION

PATENT NO. : 10,289,619 B2
APPLICATION NO. : 15/946128
DATED : May 14, 2019
INVENTOR(S) : Wei Xiao et al.

It is certified that error appears in the above-identified patent and that said Letters Patent is hereby corrected as shown below:

In the Specification

Column 7, Line 32:
Delete the phrase "l=1, . . . , v i=1, . . . , T," and replace with --$l = 1, \ldots, v, i = 1, \ldots, T$,--.

Column 10, Line 24:
Delete the phrase "$C_1^x, C_2^x, \ldots, C_{m1}^x$, where $C_1^x < C_2^x < \cdots < C_{m1}^x$, and $m1'$ is" and replace with --$C_1^x, C_2^x, \ldots, C_{m1'}^x$, where $C_1^x < C_2^x < \cdots < C_{m1'}^x$, and $m1'$ is--.

Column 10, Lines 27-30:
Delete the phrase "$C_1^x, C_2^x, \ldots, C_{m1}^x$. Additional external bin boundaries $C_0^x$ and $C_{m1'+1}^x$ may be created by default such that $C_0^x = -\infty$ and $C_{m1'+1}^x = \infty$" and replace with -- $C_1^x, C_2^x, \ldots, C_{m1'}^x$. Additional external bin boundaries $C_0^x$ and $C_{m1'+1}^x$ may be created by default such that $C_0^x = -\infty$ and $C_{m1'+1}^x = \infty$--.

Column 10, Lines 33-50:
Delete the paragraph "In an operation 214, a seventh indicator may be received that indicates second variable internal bin boundary points $C_1^y, C_2^y, \ldots, C_{m2'}^y$ where $C_1^y < C_2^y < \cdots < C_{m2}^y$, and $m2'$ is a number of second variable internal bin boundary points, and processing continues in an operation 228. For example, a user may interact with a user interface to select or enter the second variable internal bin boundary points $C_1^y, C_2^y, \ldots, C_{m2'}^y$. Additional external bin boundaries $C_0^y$ and $C_{m2'+1}^y$ may be created by default such that $C_0^y = -\infty$ and $C_{m2'+1}^y = \infty$ to define $m2 = m2' + 1$ second variable bins. The $m2$ second variable bins discretize a second variable of the paired variables indicated in operation 202 into $m2$ ranges. For illustration, referring to FIG. 3, a bin matrix 300 can be defined based on $m1 = 4$ and $m2 = 5$ to define $C_0^x, C_1^x, C_2^x, C_3^x, C_4^x$ based on input values $C_1^x, C_2^x, C_3^x$ defined using the sixth indicator and to define $C_0^y, C_1^y, C_2^y, C_3^y, C_4^y, C_5^y$ based on input values $C_1^y, C_2^y, C_3^y, C_4^y$ defined using the seventh indicator." and replace with -- In an operation 214, a seventh indicator may be received Signed and Sealed this
Twenty-second Day of October, 2019

Andrei Iancu
*Director of the United States Patent and Trademark Office*

CERTIFICATE OF CORRECTION (continued)
U.S. Pat. No. 10,289,619 B2 that indicates second variable internal bin boundary points $C_1^y, C_2^y, \ldots, C_{m2'}^y$, where $C_1^y < C_2^y < \ldots < C_{m2'}^y$, and $m2'$ is a number of second variable internal bin boundary points, and processing continues in an operation 228. For example, a user may interact with a user interface to select or enter the second variable internal bin boundary points $C_1^y, C_2^y, \ldots, C_{m2'}^y$. Additional external bin boundaries $C_0^y$ and $C_{m2'+1}^y$ may be created by default such that $C_0^y = -\infty$ and $C_{m2'+1}^y = \infty$ to define $m2 = m2' + 1$ second variable bins. The $m2$ second variable bins discretize a second variable of the paired variables indicated in operation 202 into $m2$ ranges. For illustration, referring to FIG. 3, a bin matrix 300 can be defined based on $m1 = 4$ and $m2 = 5$ to define $C_0^x, C_1^x, C_2^x, C_3^x, C_4^x$ based on input values $C_1^x, C_2^x, C_3^x$ defined using the sixth indicator and to define $C_0^y, C_1^y, C_2^y, C_3^y, C_4^y, C_5^y$ based on input values $C_1^y, C_2^y, C_3^y, C_4^y$ defined using the seventh indicator.--.

Column 11, Line 19:
Delete the phrase "$C_1^x, C_2^x, \ldots, C_{n1}^x$. Again, C $C_0^x = -\infty$ and $C_{m1'+1}^x = \infty$" and replace with --$C_1^x, C_2^x, \ldots, C_{m1'}^x$. Again, $C_0^x = -\infty$ and $C_{m1'+1}^x = \infty$--.

Column 11, Lines 30-31:
Delete the phrase "$C_1^y, C_2^y, \ldots, C_{m2}^y$. Again, C $C_0^y = -\infty$ and $C_{m2'+1}^y = \infty$" and replace with --$C_1^y, C_2^y, \ldots, C_{m2'}^y$. Again, $C_0^y = -\infty$ and $C_{m2'+1}^y = \infty$--.

Column 11, Lines 43-46:
Delete the phrase "vector $n_r[i] = \Sigma_{j=1}^{m2} M[i,j]$ of each row $i = 1, \ldots, m1$ of bin data $M$, column sum vector $n_c[j] = \Sigma_{i=1}^{m1} M[i,j]$ of each column $j = 1, \ldots, m2$ of bin data $M$, and $n = \Sigma_{i=1}^{m1} \Sigma_{j=1}^{m2} M[i,j]$." and replace with --vector $n_r[i] = \sum_{j=1}^{m2} M[i,j]$ of each row $i = 1, \ldots, m1$ of bin data $M$, column sum vector $n_c[j] = \sum_{i=1}^{m1} M[i,j]$ of each column $j = 1, \ldots, m2$ of bin data $M$, and $n = \sum_{i=1}^{m1} \sum_{j=1}^{m2} M[i,j]$--.

Column 13, Line 55:
Delete the phrase "$C_1 = \sqrt{\sum_{i=1}^{m1} n_r[i](r_{1r}[i])^2}$." and replace with --$C_1 = \sqrt{\sum_{i=1}^{m1} n_r[i](r_{1r}[i])^2}$--.

Column 13, Lines 60-61:
Delete the phrase "$r_{2c}[j] = [j]/C_2$, where $C_2 = \sqrt{\sum_{j=1}^{m2} n_c[j](r_{1c}[j])^2}$." and replace with --$r_{2c}[j] = [j]/C_2$, where $C_2 = \sqrt{\sum_{j=1}^{m2} n_c[j](r_{1c}[j])^2}$--.

Column 13, Line 63:
Delete the phrase "$c_s = r_{2r}{}^T M r_{2c}$." and replace with -- $c_S = r_{2r}^T M r_{2c}$ --.

Column 14, Line 34:
Delete the phrase "$N[i,j] = \Sigma_{l1=1}^{i-1} \Sigma_{l2=1}^{j-1} M[l1, l2]$" and replace with -- $N[i,j] = \sum_{l1=1}^{i-1} \sum_{l2=1}^{j-1} M[l1, l2]$ --.

Column 14, Lines 37-38:
Delete the phrase "$P = \Sigma_{i=1}^{m1} \Sigma_{j=1}^{m2} M[i,j] * N[i,j]$." and replace with -- $P = \sum_{i=1}^{m1} \sum_{j=1}^{m2} M[i,j] * N[i,j]$ --.

Column 14, Line 40:
Delete the phrase "$T = [\Sigma_{i=1}^{m1} ((n_r[i])^2 - \Sigma_{j=1}^{m2} (M[i,j])^2)]/2$." and replace with -- $T = [\sum_{i=1}^{m1}((n_r[i])^2 - \sum_{j=1}^{m2}(M[i,j])^2)]/2$ --.

Column 14, Line 42:
Delete the phrase "$U = [\Sigma_{j=1}^{m2} ((n_c[j])^2 - \Sigma_{i=1}^{m1} (M[i,j])^2)]/2$." and replace with -- $U = [\sum_{j=1}^{m2}((n_c[j])^2 - \sum_{i=1}^{m1}(M[i,j])^2)]/2$ --.

Column 14, Lines 44-45:
Delete the phrase "$B = \Sigma_{i=1}^{m1} \Sigma_{j=1}^{m2} M[i,j] * (M[i,j] - 1)/2$." and replace with -- $B = \sum_{i=1}^{m1} \sum_{j=1}^{m2} M[i,j] * (M[i,j] - 1)/2$ --.

Column 14, Line 66:
Delete the phrase "$y_i = (z_i + \sigma x_i / \sqrt{\sigma + + 1}$," and replace with -- $y_i = (z_i + \sigma x_i / \sqrt{\sigma^2 + 1}$, --.

Column 15, Line 1:
Delete the phrase "$\{x_i\}_{i=1}^T$ and $\{y_i\}_{i=1}^T$" and replace with -- $\{x_i\}_{i=1}^T$ and $\{y_i\}_{i=1}^T$ --.

Column 15, Line 3:
Delete the phrase "$\sigma/\sqrt{\sigma + 1}$," and replace with -- $\sigma/\sqrt{\sigma^2 + 1}$. --.

In the Claims

Claim 3, Column 32, Line 1:
Delete the phrase "the computing device to Q repeat (a) to (h)" and replace with --the computing device to (k) repeat (a) to (h)--.

Claim 21, Column 33, Line 54:

Delete the phrase "$C_1 = \sqrt{\sum_{i=1}^{m1} n_r[i](r_{1r}[i])^2}$," and replace with --$C_1 = \sqrt{\sum_{j=1}^{m2} n_c[j](r_{1c}[j])^2}$,--.

Claim 21, Column 33, Line 66:

Delete the phrase "$C_2 = \Sigma_{j=1}^{m2} n_c[j](r_{1c}[j])^2$," and replace with -- $C_2 = \sqrt{\sum_{j=1}^{m2} n_c[j](r_{1c}[j])^2}$,--.

Claim 21, Column 34, Line 2:

Delete the phrase "$c_S = r_{2r}{}^T M r_{2c}$," and replace with --$c_S = r_{2r}^T M r_{2c}$,--.

Claim 23, Column 34, Line 11:
Delete the phrase "$P = \Sigma_{i=1}^{m1} \Sigma_{j=1}^{m2} M[i,j] * \Sigma_{l1=1}^{i-1} \Sigma_{l2=1}^{j-1} M[l1, l2]$" and
replace with --$P = \sum_{i=1}^{m1} \sum_{j=1}^{m2} M[i,j] * \sum_{l1=1}^{i-1} \sum_{l2=1}^{j-1} M[l1, l2]$,--.

Claim 23, Column 34, Line 15:
Delete the phrase "$T = [\Sigma_{i=1}^{m1} ((n_r[i])^2 - \Sigma_{j=1}^{m2} (M[i,j])^2)]/2$," and replace with
--$T = [\sum_{i=1}^{m1}((n_r[i])^2 - \sum_{j=1}^{m2}(M[i,j])^2)]/2$,--.

Claim 23, Column 34, Line 18:
Delete the phrase "$U = [\Sigma_{j=1}^{m2} ((n_c[j])^2 - \Sigma_{i=1}^{m1} (M[i,j])^2)]/2$," and replace with
--$U = [\sum_{j=1}^{m2}((n_c[j])^2 - \sum_{i=1}^{m1}(M[i,j])^2)]/2$,--.

Claim 23, Column 34, Line 21:
Delete the phrase "$B = \Sigma_{i=1}^{m1} \Sigma_{j=1}^{m2} M[i,j] * (M[i,j] - 1)/2$;" and replace with
--$B = \sum_{i=1}^{m1} \sum_{j=1}^{m2} M[i,j] * (M[i,j] - 1)/2$;--.

Claim 27, Column 35, Line 45:

Delete the phrase "$C_1 = \Sigma_{i=1}^{m1} n_r[i](r_{1r}[i])^2$" and replace with -- $C_1 = \sqrt{\sum_{i=1}^{m1} n_r[i](r_{1r}[i])^2}$,--.

Claim 27, Column 35, Line 57:

Delete the phrase "$C_2 = \sqrt{\sum_{j=1}^{m2} n_c[j](r_{1c}[j])^2}$," and replace with --$C_2 = \sqrt{\sum_{j=1}^{m2} n_c[j](r_{1c}[j])^2}$,--.

Claim 27, Column 35, Line 60:

Delete the phrase "$c_S = r_{2r}{}^T M r_{2c}$," and replace with --$c_S = r_{2r}^T M r_{2c}$,--.

Claim 28, Column 35, Line 65:
Delete the phrase "$P = \Sigma_{i=1}^{m1} \Sigma_{j=1}^{m2} M[i,j] * \Sigma_{l1=1}^{i-1} \Sigma_{l2=1}^{j-1} M[l1, l2]$," and replace
with --$P = \sum_{i=1}^{m1} \sum_{j=1}^{m2} M[i,j] * \sum_{l1=1}^{i-1} \sum_{l2=1}^{j-1} M[l1, l2]$,--.

CERTIFICATE OF CORRECTION (continued)
U.S. Pat. No. 10,289,619 B2

Claim 28, Column 36, Line 2:
Delete the phrase "$T = [\Sigma_{i=1}^{m1} ((n_r[i])^2 - \Sigma_{j=1}^{m2} (M[i,j])^2)]/2$," and replace with
-- $T = [\sum_{i=1}^{m1}((n_r[i])^2 - \sum_{j=1}^{m2}(M[i,j])^2)]/2,$ --.

Claim 28, Column 36, Line 5:
Delete the phrase "$U = [\Sigma_{j=1}^{m2} ((n_c[j])^2 - \Sigma_{i=1}^{m1} (M[i,j])^2)]/2$," and replace with
-- $U = [\sum_{j=1}^{m2}((n_c[j])^2 - \sum_{i=1}^{m1}(M[i,j])^2)]/2,$ --.

Claim 28, Column 36, Line 8:
Delete the phrase "$B = \Sigma_{i=1}^{m1} \Sigma_{j=1}^{m2} M[i,j] * (M[i,j] - 1)/2;$" and replace with
-- $B = \sum_{i=1}^{m1}\sum_{j=1}^{m2} M[i,j] * (M[i,j] - 1)/2;$ --.